United States Patent
Sternklar et al.

(10) Patent No.: US 11,686,621 B2
(45) Date of Patent: **\*Jun. 27, 2023**

(54) METHOD AND SYSTEM FOR SPECTROSCOPY

(71) Applicant: Ariel Scientific Innovations Ltd., Ariel (IL)

(72) Inventors: Shmuel Sternklar, Yakir (IL); Ziv Glasser, Ariel (IL)

(73) Assignee: Ariel Scientific Innovations Ltd., Ariel (IL)

( * ) Notice: Subject to any disclaimer, the term of this patent is extended or adjusted under 35 U.S.C. 154(b) by 41 days.

This patent is subject to a terminal disclaimer.

(21) Appl. No.: 17/517,743

(22) Filed: Nov. 3, 2021

(65) Prior Publication Data

US 2022/0057265 A1    Feb. 24, 2022

Related U.S. Application Data

(62) Division of application No. 16/603,589, filed as application No. PCT/IL2018/050386 on Apr. 2, 2018, now Pat. No. 11,187,583.

(60) Provisional application No. 62/483,397, filed on Apr. 9, 2017.

(51) Int. Cl.
*G01J 3/44* (2006.01)
(52) U.S. Cl.
CPC ...................................... *G01J 3/44* (2013.01)
(58) Field of Classification Search
CPC ............................................................ G01J 3/44
See application file for complete search history.

(56) References Cited

U.S. PATENT DOCUMENTS

| 5,339,155 A | 8/1994 | Partridge et al. |
|---|---|---|
| 7,945,852 B1 | 5/2011 | Pilskalns |
| 2004/0174522 A1 | 9/2004 | Hagler |
| 2012/0044479 A1 | 2/2012 | Roulston et al. |
| 2012/0112096 A1 | 5/2012 | Meyers et al. |
| 2013/0107263 A1 | 5/2013 | Braun et al. |

(Continued)

FOREIGN PATENT DOCUMENTS

| WO | WO 94/13199 | 6/1994 |
|---|---|---|
| WO | WO 2018/189737 | 10/2018 |

OTHER PUBLICATIONS

International Preliminary Report on Patentability dated Oct. 24, 2019 From the International Bureau of WIPO Re. Application No. PCT/IL2018/050386. (16 Pages).

(Continued)

*Primary Examiner* — Jamil Ahmed

(57) ABSTRACT

A method of spectroscopy, comprises: transmitting output radiation to a sample; collecting from the sample input radiation being indicative of interaction between the output radiation and the sample; modulating at least one of the output radiation and the input radiation, wherein at least one of the output radiation and the modulation is characterized by a scanned parameter; combining the input radiation, following the modulation, with a reference signal to provide a combined signal; processing the combined signal to construct a vector describing a dependence of a radiation property of the input radiation on the parameter; and at least partially identifying the sample or a change in comprises sample based on at least the vector.

20 Claims, 9 Drawing Sheets

(56) References Cited

U.S. PATENT DOCUMENTS

| | | | |
|---|---|---|---|
| 2015/0330951 A1 | 11/2015 | Gordon et al. | |
| 2016/0109294 A1* | 4/2016 | Kasper | G01J 3/433 250/339.07 |
| 2018/0344260 A1 | 12/2018 | Maffessanti et al. | |
| 2020/0271521 A1 | 8/2020 | Sternklar et al. | |

OTHER PUBLICATIONS

International Search Report and the Written Opinion dated Sep. 6, 2018 From the International Searching Authority Re. Application No. PCT/IL2018/050386. (21 Pages).
Notice of Allowance dated Jul. 26, 2021 from the Re. U.S. Appl. No. 16/603,589. (7 pages).
Official Action dated Feb. 24, 2021 From the Re. U.S. Appl. No. 16/603,589. (23 Pages).
Supplementary European Search Report and the European Search Opinion dated Dec. 2, 2020 From the European Patent Office Re. Application No. 18784199.4. (8 Pages).
Bellido et al. "Spectral Analysis Using A Dispersive Microwave Photonics Link Based on A Broadband Chirped Fiber Bragg Grating", Journal of Lightwave Technology, 33(20): 4207-4214, Aug. 10, 2015.
Chi et al. "Fiber Chromatic Dispersion Measurement Based on Wavelength-to-Time Mapping Using A Femtosecond Pulse Laser and An Optical Comb Filter", Optics Communications, 280(2): 337-342. Dec. 15, 2007.
Chou et al. "Time-Wavelength Spectroscopy for Chemical Sensing", IEEE Photonics Technology Letters, 16(4): 1140-1142, Apr. 2004.
Efremov et al. "Achievements in Resonance Raman Spectroscopy Review of A Technique With A Distinct Analytical Chemistry Potential", Analytica Chimica Acta, 606: 119-134. Published Online Nov. 26, 2007.
Furse et al. "Frequency-Domain Reflecometerv for On-Board Testing of Aging Aircraft Wiring", IEEE Transactions on Electromagnetic Compatibility, 45(2): 306-315, May 2003.
Ghafoori-Shiraz et al. "Fault Location in Optical Fibers Using Optical Frequency Domain Reflectometry". Journal of Lightwave Technology, LT-4(3): 316-322, Mar. 1986.
Hervas et al. "An Interrogation Technique of FBG Cascade Sensors Using Wavelength to Radio-Frequency Delay Mapping", Journal of Lightwave Technology, 13(11): 2222-2227, Mar. 5, 2015.
Kelkar et al. "Time-Domain Optical Sensing", Electronics Letters. 35(19): 1661-1662, Published Online Jul. 6, 1999.
Le Ru et al. "Surface Enhanced Raman Scattering Enhancement Factors: A Comprehensive Study", The Journal of Physical Chemistry C, 111(37): 13794-13803, Published on Web Aug. 23, 2007.
Lee et al. "M13 Bacteriophage as Materials for Amplified Surface Enhanced Raman Scattering Protein Sensing", Advanced Functional Materials, 24(14): 2079-2084, Apr. 2014.
Liehr et al. "Performance of Digital Incoherent OFDR and Prospects for Optical Fiber Sensing Applications", 23rd International Conference on Optical Fibre Sensors, Proceedings of the SPIE, 9157: 915737-1-915737-4, Jun. 2, 2014.
Lucarini et al. "Kramers-Kronig Relations in Optical Materials Research", Springer Series in Optical Sciences, 110: 1-160, 2005.
Overman et al. "Effects of Virion and Salt Concentrations on the Raman Signatures of Filamentous Phages Fd, Pf1, Pf3, and PH75", Biochemistry, 43(41): 13129-13136, Published on Web Sep. 24, 2004.
Park et al. "Elimination of the Fibre Chromatic Dispersion Penalty on 1550nm Millimetre-Wave Optical Transmission", Electronic Letters. 33(6): 512-513, Mar. 13, 1997.
Ricchiuti et al. "Long Fiber Bragg Grating Sensor Interrogation Using Discrete-Time Microwave Photonic Filtering Techniques", Optics Express. 21(23): 28175-28181, Published Online Nov. 8, 2013.
Soller et al. "High Resolution Optical Frequency Domain Reflectometry for Characterization of Components and Assemblies", Optics Express, 132): 666-674, Jan. 24, 2005.
Solli et al. "Amplified Wavelength-Time Transformation for Real-Time Spectroscopy", Nature Photonics, 2(1): 48-51, Published Online Dec. 21, 2007.
Tong et al. "Fibre Dispersion or Pulse Spectrum Measurement Using A Sampling Oscilloscope", Electronic Letters, 33(11): 983-985, May 22, 1997.
Tsen el al. "Inactivation of Viruses by Laser-Driven Coherent Excitations Via Impulsive Stimulated Raman Scattering Process", Journal of Biomedical Optics. 12(6): 064030-1-064030-6, Published Online Dec. 14, 2007.
Wang et al. "Analysis of A High-Speed Fiber-Optic Spectrometer for Fiber-Optic Sensor Signal Processing", Applied Optics, 46(33): 8149-8158, Published Online Nov. 19, 2007.
Wang et al. "High-Speed Fiber-Optic Spectrometer for Signal Demodulation of Inteferometric Fiber-Optic Sensors", Optics Letters, 31(16): 2408-2410, Aug. 15, 2006.
Yuksel et al. "Optical Frequency Domain Reflectometry: A Review", Proceedings of the 11th International Conference on Transparent Optical Networks, ICTON'09, Jun. 28-Jul. 2, 2009, Conference Paper TuC2.5, 1: 723-727, Jun. 28, 2009.

* cited by examiner

METHOD AND SYSTEM FOR SPECTROSCOPY

RELATED APPLICATIONS

This application is a division of U.S. patent application Ser. No. 16/603,589 filed on Oct. 8, 2019, which is a National Phase of PCT Patent Application No. PCT/IL2018/050386 having International Filing Date of Apr. 2, 2018, which claims the benefit of priority under 35 USC § 119(e) of U.S. Provisional Patent Application No. 62/483,397 filed on Apr. 9, 2017. The contents of the above applications are all incorporated by reference as if fully set forth herein in their entirety.

FIELD AND BACKGROUND OF THE INVENTION

The present invention, in some embodiments thereof, relates to spectroscopy and, more particularly, but not exclusively, to a method and system for spectroscopy, e.g., Raman spectroscopy.

Spectroscopy is a technique for characterizing the spectral content of radiation. For example, in many applications the interaction between matter and radiation is investigated, for the purpose of materials characterization. Spectroscopic data is often represented by a spectrum, a plot of the response of interest as a function of wavelength or frequency, which spectrum can be analyzed to identify molecular species. In another example, it is desired to monitor the spectral content of the radiation source. In other applications, the spectral content is dependent a physical change of the environment or the material with which the radiation is interacting, and it is desired to monitor this physical change.

In some spectroscopy techniques, the radiation interacts with matter to produce radiation having a particular spectral content. One example of spectroscopy is Raman spectroscopy. In Raman spectroscopy, the scattering is inelastic, namely the scattering process results in a shift in the wavelength of the radiation. Raman spectroscopy is a powerful tool that has found numerous applications in a wide variety of areas [Hargreaves, et al., J. Raman Spectrosc., 29, 873 (2008)]. Another type of spectroscopy that is based on inelastic scattering is Brillouin spectroscopy, which is used to characterize certain viscoelastic properties and other properties of media.

Additional background art includes Blackie et al., J. Phys. Chem. C 111 (37): 13794 (2007); Evtim et al., Analytica Chimica Acta 606, 119 (2008); Lee et al., Adv. Funct. Mater. 2014, 24, 2079-2084; Tsen et al., 2007, Journal of Biomedical Optics 12: 1-6; and Overman et al., Biochemistry, 43, 13129-13136.

SUMMARY OF THE INVENTION

According to an aspect of some embodiments of the present invention there is provided a method of spectroscopy. The method comprises: transmitting output radiation to a sample; collecting from the sample input radiation being indicative of interaction between the output radiation and the sample; modulating at least one of the output radiation and the input radiation, wherein at least one of the output radiation and the modulation is characterized by a scanned parameter; combining the input radiation, following the modulation, with a reference signal to provide a combined signal; processing the combined signal to construct a vector describing a dependence of a radiation property of the input radiation on the parameter; and at least partially identifying the sample or a change in comprises sample based on at least the vector.

According to some embodiments of the invention the reference signal is a non-dispersed optical signal. According to some embodiments of the invention the method wherein the reference signal is an electrical signal. According to some embodiments of the invention the parameter comprises modulation frequency. According to some embodiments of the invention the parameter comprises a modulation phase. According to some embodiments of the invention the parameter comprises a modulation amplitude. According to some embodiments of the invention the parameter comprises a modulation polarization. According to some embodiments of the invention the parameter comprises frequency of the output radiation.

According to some embodiments of the invention the processing comprises constructing an additional vector describing a dependence of an additional radiation property of the input radiation on the parameter, and wherein the at least partially identifying is based on both the vectors.

According to some embodiments of the invention the invention the method comprises calculating a spectrum of the input radiation using the vectors, wherein the at least partially identifying is based on the calculated spectrum.

According to some embodiments of the invention the invention the method comprises constructing a map spanned by the vector, wherein the at least partially identifying comprises comparing the map to an annotated map.

According to some embodiments of the invention the method comprises accessing a database comprises a plurality of entries, each having a map and annotation information, and searching the database for an entry having a map similar to the constructed map, wherein the annotated map is the similar map annotated according to annotation information of the entry.

According to some embodiments of the invention the parameter comprises modulation frequency, and the vector is a vector of amplitudes describing a dependence of amplitude of the input radiation on the modulation frequency.

According to some embodiments of the invention the parameter comprises modulation frequency, and the vector describes a dependence of a phase of the input radiation on the modulation frequency.

According to some embodiments of the invention the parameter comprises modulation frequency, wherein the modulation is characterized by a discrete set of modulation frequencies.

According to some embodiments of the invention the parameter comprises modulation frequency, wherein the identification or partial identification is also based on medium-specific functional dependences of amplitudes and phases on the modulation frequency and a carrier frequency of the input radiation.

According to some embodiments of the invention the modulation comprises periodically varying at least one physical property of the sample, to effect modulation of the radiation resulting from an interaction between the output radiation and the sample.

According to an aspect of some embodiments of the present invention there is provided a method of spectroscopy. the method comprises: transmitting output radiation to a sample; collecting from the sample input radiation being indicative of interaction between the output radiation and the sample; modulating at least one of the output radiation and the input radiation, wherein the modulation is characterized by a discrete set of modulation frequencies; processing the input radiation, following the modulation, to construct a vector describing a dependence of a radiation property of the input radiation on the discrete set of modulation frequencies; and determining changes in at least one property of the sample based on at least the vector, in a frequency domain and without transforming the vector to a time-domain.

According to an aspect of some embodiments of the present invention there is provided a method of spectroscopy. The method comprises: transmitting output radiation to a sample; collecting from the sample input radiation being indicative of interaction between the output radiation and the sample, following propagation of the input radiation in a medium; modulating at least one of the output radiation and the input radiation, the modulation being characterized by a scanned modulation frequency; processing the input radiation, following the modulation, to construct a vector describing a dependence of a radiation property of the input radiation on the modulation frequency; at least partially identifying the sample or a change in comprises sample based on at least the vector and medium-specific functional dependences of amplitudes and phases on the modulation frequency and a carrier frequency of the input radiation.

According to some embodiments of the invention the functional dependence is expressed as a matrix and wherein the identification or partial identification is by matrix manipulations.

According to some embodiments of the invention the vector is a vector of amplitudes describing a dependence of amplitude of the input radiation on the modulation frequency.

According to some embodiments of the invention the method comprises employing transformation to the vector of amplitudes to provide a vector of phases describing a dependence of a phase of the input radiation on of the parameter, wherein the at least partially identifying is based on both the vectors.

According to some embodiments of the invention the vector describes a dependence of a phase of the input radiation on the modulation frequency.

According to some embodiments of the invention the processing comprises constructing an additional vector describing a dependence of amplitude of the input radiation on the parameter and wherein the at least partially identifying is based on both the vectors.

According to some embodiments of the invention the radiation is optical radiation.

According to some embodiments of the invention the transmission and collection is by an optical probe which is devoid of any free-space propagation sections.

According to some embodiments of the invention the processing is, in part, by an optical detector which is devoid of any free-space propagation sections.

According to some embodiments of the invention the processing is at a single spatial channel for all wavelengths of the input radiation, following the modulation.

According to some embodiments of the invention the processing comprises dispersing the input radiation according to a preselected dispersion relation, and wherein the vector is constructed at least in part based on the dispersion relation.

According to some embodiments of the invention the modulating is by an RF signal.

According to some embodiments of the invention the method comprises calculating a spectrum of the input radiation using the vector, wherein the at least partially identifying is based on the calculated spectrum.

According to some embodiments of the invention the identification or partial identification comprises comparing the vector to an annotated vector.

According to some embodiments of the invention the method comprises accessing a database comprises a plurality of entries, each having a vector and annotation information, and searching the database for an entry having a vector similar to the constructed vector, wherein the annotated vector is the similar vector annotated according to annotation information of the entry.

According to an aspect of some embodiments of the present invention there is provided a spectroscopy system. The spectroscopy system comprises: a radiation probe configured for transmitting output radiation to a sample and collecting input radiation from the sample, the input radiation being indicative of interaction between the output radiation and the sample; a modulator configured for modulating at least one of the output radiation and the input radiation; wherein at least one of the output radiation and the modulation is characterized by a scanned modulation parameter; a feedback circuit for combining the input radiation, following the modulation, with a reference signal to provide a combined signal; a signal processing system configured for processing the combined signal to provide a processed combined signal; and a data processor configured for constructing, based on the processed combined signal, a vector describing a dependence of a radiation property of the processed input radiation on the parameter, and at least partially identifying the sample or a change in comprises sample based on at least the vector.

According to some embodiments of the invention the reference signal is a non-dispersed optical signal exiting the modulator and the feedback circuit comprises an optical fiber carrying the non-dispersed optical signal.

According to some embodiments of the invention reference signal is an electrical signal feeding the modulator and the feedback circuit comprises an electrical line carrying the electrical signal.

According to an aspect of some embodiments of the present invention there is provided a spectroscopy system. The spectroscopy system comprises: a radiation probe configured for transmitting output radiation to a sample and collecting input radiation from the sample, the input radiation being indicative of interaction between the output radiation and the sample; a modulator configured for modulating at least one of the output radiation and the input radiation, wherein the modulation is characterized by a discrete set of modulation frequencies; a signal processing system configured for processing the input radiation, following the modulation, to construct a vector describing a dependence of a radiation property of the input radiation on the discrete set of modulation frequencies; and a data processor configured for constructing, based on the processed combined signal, a vector describing a dependence of a radiation property of the processed input radiation on the parameter, and determining changes in at least one property of the sample based on at least the vector, in a frequency domain and without transforming the vector to a time-domain.

According to an aspect of some embodiments of the present invention there is provided a method of constructing a database for the identification or partial identification of substances. The method comprises: providing a plurality of substances, each being identified by identifying information; for each substance: transmitting output radiation to the substance; collecting from the substance input radiation being indicative of interaction between the output radiation and the substance; modulating at least one of the output radiation and the input radiation, wherein at least one of the output radiation and the modulation is characterized by a scanned parameter; processing the input radiation, following the modulation, to construct a vector describing a dependence of a radiation property of the input radiation on the parameter; and storing in a computer readable medium the vector and a respective identifying information as a database entry corresponding to the substance.

According to an aspect of some embodiments of the present invention there is provided a method of analyzing a spectrum of a radiation source transmitting output radiation. The method comprises: collecting input radiation being indicative of the transmitted output radiation; modulating at least one of the output radiation and the input radiation, wherein at least one of the output radiation and the modulation is characterized by a scanned parameter; combining the input radiation, following the modulation, with a reference signal to provide a combined signal; processing the combined signal to construct a vector describing a dependence of a radiation property of the input radiation on the parameter; and reconstructing a spectrum of the input radiation based on at least the vector.

According to an aspect of some embodiments of the present invention there is provided a method of analyzing a spectrum of a radiation source transmitting output radiation. The method comprises: collecting input radiation being indicative of the transmitted output radiation; modulating at least one of the output radiation and the input radiation, wherein the modulation is characterized by a discrete set of modulation frequencies; processing the input radiation, following the modulation to construct a vector describing a dependence of a radiation property of the input radiation on the discrete set of modulation frequencies; and determining changes in at least one property of the sample based on at least the vector, in a frequency domain and without transforming the vector to a time-domain.

According to an aspect of some embodiments of the present invention there is provided a method of spectroscopy. The method comprises: transmitting output radiation to a sample; collecting from the sample input radiation being indicative of interaction between the output radiation and the sample, following propagation of the input radiation in a medium; modulating at least one of the output radiation and the input radiation, the modulation being characterized by a scanned modulation frequency; processing the processing the input radiation, following the modulation, to construct a vector describing a dependence of a radiation property of the input radiation on the modulation frequency; at least partially identifying the sample or a change in comprises sample based on at least the vector and medium-specific functional dependences of amplitudes and phases on the modulation frequency and a carrier frequency of the input radiation.

According to an aspect of some embodiments of the present invention there is provided a system for analyzing a spectrum of a radiation source transmitting output radiation. The system comprises: a radiation probe configured for collecting input radiation being indicative of the transmitted output radiation; a modulator configured for modulating at least one of the output radiation and the input radiation; wherein at least one of the output radiation and the modulation is characterized by a scanned modulation parameter; a feedback circuit for combining the input radiation, following the modulation, with a reference signal to provide a combined signal; a signal processing system configured for processing the combined signal to provide a processed combined signal; and a data processor configured for constructing, based on the processed combined signal, a vector describing a dependence of a radiation property of the processed input radiation on the parameter, and reconstructing a spectrum of the input radiation based on at least the vector.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
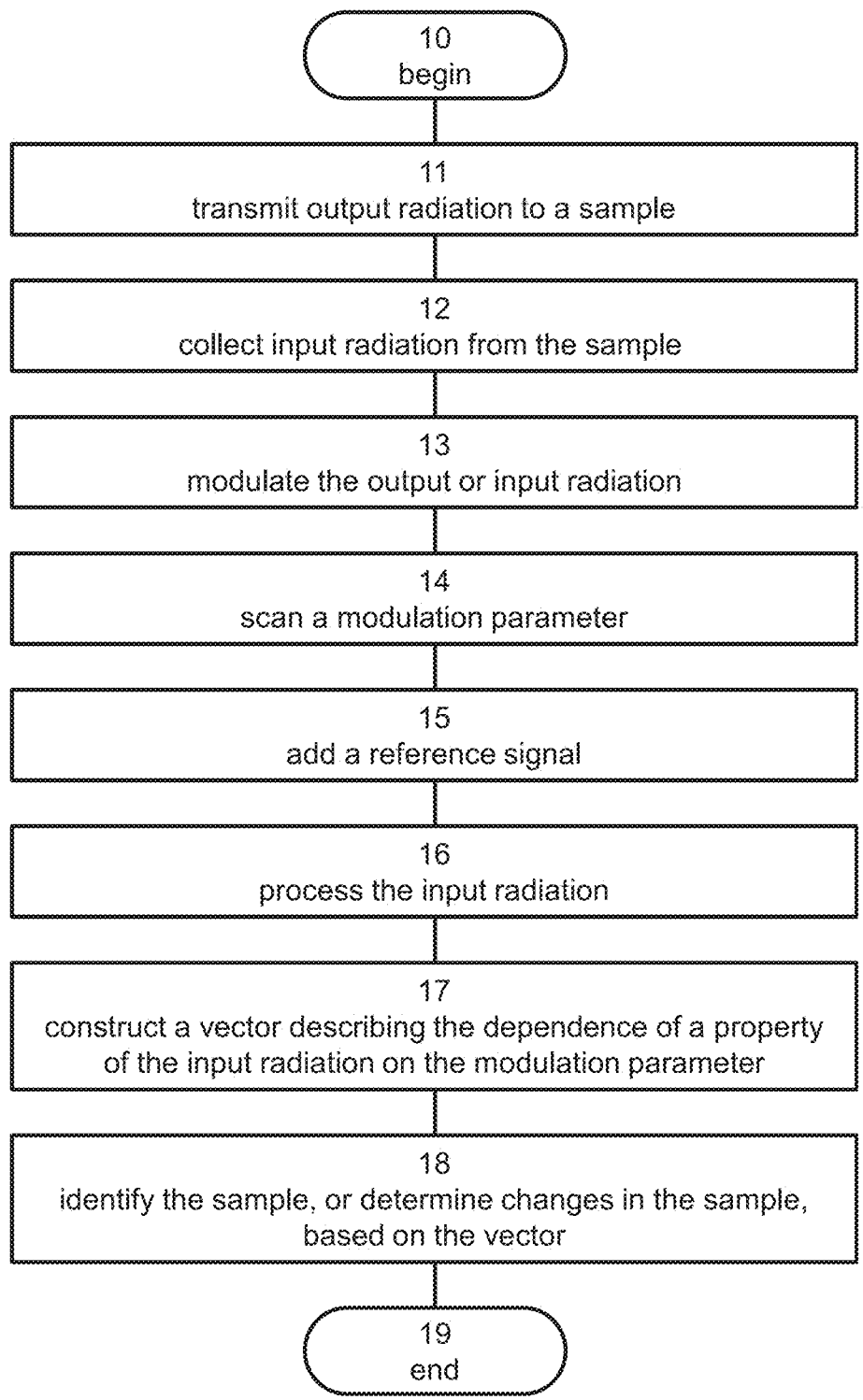
FIG. 1 is a flowchart diagram of a method suitable for spectroscopy according to some embodiments of the present invention.

The present invention, in some embodiments thereof, relates to spectroscopy and, more particularly, but not exclusively, to a method and system for spectroscopy, e.g., Raman spectroscopy.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a flowchart diagram of a method suitable for spectroscopy according to some embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

Selected operations of the method can be embodied on a tangible medium such as a computer for performing the method steps. Selected operations of the method can be embodied on a computer readable medium, comprising computer readable instructions for carrying out the method steps. Selected operations of the method can also be embodied in electronic device having digital computer capabilities arranged to run the computer program on the tangible medium or execute the instruction on a computer readable medium.

Computer programs implementing selected operations of the method of the present embodiments can commonly be distributed to users by a communication network or on a distribution medium such as, but not limited to, a floppy disk, a CD-ROM, a flash memory device and a portable hard drive. From the communication network, or distribution medium, the computer programs can be copied to a hard disk or a similar intermediate storage medium. The computer programs can be run by loading the code instructions either from their distribution medium or their intermediate storage medium into the execution memory of the computer, configuring the computer to act in accordance with the method of this invention. All these operations are well-known to those skilled in the art of computer systems.

Referring now to FIG. 1, the method begins at 10 and continues to 11 at which output radiation is transmitted to a sample. The output radiation can be of any type suitable for spectroscopy. Preferably, the output radiation is optical radiation, more preferably monochromatic optical radiation. When the radiation is monochromatic optical radiation, the bandwidth of the radiation is optionally and preferably at least 5 times or at least 10 times less than the desired spectral resolution. Other types of radiation are also contemplated The method proceeds to 12 at which input radiation is collected from the sample. The input radiation can be collected after it has been reflected by or transmitted through the sample, and is indicative of the interaction between the output radiation and the sample. Typically, the interaction results in the radiation being scattered off the sample or partially absorbed by the sample. For example, when the method is used for scattering spectroscopy, e.g., Brillouin spectroscopy or Raman spectroscopy, including, without limitation, resonant Raman scattering spectroscopy, surface-enhanced Raman scattering spectroscopy, and stimulated Raman spectroscopy, the input radiation can be radiation scattered off the sample.

At 13 the output radiation and/or input radiation is modulated. The modulation can be of any type selected from the group consisting of frequency modulation, phase modulation, amplitude modulation, polarization modulation, and any combination of two or more of these types of modulation. In some embodiments of the present invention the modulation is by a modulator effecting indirect modulation. Alternatively, a direct modulation can be employed in which case the modulation is applied to the radiation source to produce modulated radiation. Still alternatively, one or more physical properties of the sample can be varied, controllably and periodically, so as to effect modulation of the radiation as a result of the interaction between the radiation and the sample. The varied physical properties can include any of shape, temperature, size, and orientation and/or location of the sample relative to the radiation beam. The variation can be applied, by delivering periodic energy to the sample, that effect at least one of a strain, a mechanical vibration, a thermal change, an electrical change and the like. The delivered energy can be mechanical, for example, in the form of a mechanical wave, such as, but not limited to, an ultrasound wave, electrical, for example, in the form of voltage applied to the sample, thermal, for example, in the form of thermal radiation applied to the sample, or the like.

When the modulation 13 is applied to the output radiation but not to the input radiation, the modulation is applied before the radiation is transmitted to interact with the sample, so that the sample interacts with a modulated radiation. Thus, in these embodiments, 13 is preferably executed before 11. When the modulation 13 is applied to the input radiation, but not to the output radiation, the modulation is applied after the input radiation is collected from the sample, so that the sample interacts with an unmodulated radiation. Thus, in these embodiments, 13 is preferably executed after 12. When the modulation 13 is applied to both the input radiation and output radiation, 13 can be executed both before 11 and after 12.

The method optionally and preferably continues to 14 at which one or more of the parameters that characterize the modulation (e.g., frequency, amplitude, phase, polarization) and/or one or more of the parameters that characterize the radiation (frequency, intensity, pulse duration, polarization) is scanned over a predetermined range of the respective parameter.

For example, when the scanned parameter is the modulation frequency, the modulation frequency can be scanned over a range within the radiofrequency range, e.g., from about X KHz to about 40 GHz, where X is from about 1 to about 50. These embodiments are particularly useful for optical output radiation.

As demonstrated in the Examples section that follows, the present Inventors found and experimentally verified that that scanning operation 14 significantly improves the detection resolution of the spectrum measured by the method. Specifically, by a judicial selection of the scanning bandwidth, a predetermined resolution can be obtained. For example, when the scanned parameter is the modulation frequency, the spectral resolution $\delta\lambda$, defined as the difference between the closest resolved wavelengths, is inversely proportional to the scanning bandwidth $\Delta f_{BW}$ of the modulation frequency ($\delta\lambda \propto 1/\Delta f_{BW}$), so that wider scanning bandwidth provides higher resolution.

In some embodiments of the present invention the modulation is a frequency modulation characterized by a discrete set of modulation frequencies, and the scanning 14 is executed only on this set. These embodiments are particularly useful when it is desired to measure changes in one or more properties of sample, optionally without determining the property itself. The set of frequencies is therefore optionally and preferably selected to allow distinguishing the radiation from its baseline. Preferably, the lowest frequency of the set is selected in accordance with the desired spectral resolution. This can be set based on the desired phase measurement resolution ($\delta\varphi_{res}$, which is typically about 0.5, according to the following relation:

$$f_{min} = \frac{\delta\varphi_{res}}{2\pi DL\delta\lambda}$$

The number of frequencies in the set is preferably less than 100 or less than 90 or less than 80 or less than 70 or less than 60 or less than 50 or less than 40 or less than 30 or less than 20 or less than 10. Embodiments in which the set includes a single frequency are also contemplated.

When the input radiation experiences dispersion, the lowest frequency in the set is optionally and preferably, but not necessarily, at least, or more preferably higher than, the characteristic Carrier Suppression Effect (CSE) frequency of the medium through which the input radiation propagates. The CSE frequency is generally defined as the lowest value of the RF frequency at which the RF modulation signal is reduced to a minimum value, and can be expressed mathematically as $f_{CSE}=(1/\lambda)\sqrt{c/2DL}$, where $\lambda$ is the expected wavelength of the input radiation, c is the expected group speed of the input radiation, L is the length of the medium through which the input radiation propagates, and D is a dispersion function describing the change of the group delay with the wavelength or frequency of the input radiation, per unit propagation length.

While some embodiments are described herein with a particular emphasis to spectroscopy in which the modulation parameter is scanned, it is to be understood that embodiments in which the modulation parameter (e.g., modulation frequency) is fixed without scanning are also contemplated. These embodiments are particularly useful for sensing applications, for example, when it is desired to monitor a change in the sample, for example, a change in strain or a change in temperature that is induced by gain or loss of thermal energy. It was found by the Inventor that such a change can be detected even when the modulation parameter is fixed. Embodiments in which the modulation parameter (e.g., modulation frequency) is fixed are also useful when one or more of the parameters characterizing the output radiation are scanned.

In some embodiments of the present invention the method continues to 15 at which the input radiation is combined with a reference signal to provide a combined signal. The reference signal can be for example, a non-dispersed optical signal, in which case the input radiation is preferably also optical radiation.

As used herein a "non-dispersed optical signal" is an optical signal that propagates without interacting with any dispersive medium. Thus, non-dispersed optical signal propagates through a non-dispersive medium, such as, but not limited to, a non-dispersive optical fiber or air.

Alternatively, the reference signal can be an electrical signal, such as, but not limited to, an electrical signal that feeds the modulator, in which case the reference signal is added after the input radiation is converted, for example, by a radiation detector, to an electrical signal. The advantage of adding the reference signal is that it allows phase-less reconstruction of the impulse response. It was found by the Inventors that the reference signal introduces a constant term to the transfer function, and therefore facilitates determining the real part of the transfer function from the measurement of its magnitude. This, in turns, allows reconstructing the transfer function, and in particular, determining its phase, so that it is sufficient to measure only the amplitude or intensity of the input radiation, without the need to measure the phase separately.

The method continues to 16 at which the input radiation or the combined signal (in embodiments in which 15 is executed), is processed to provide a processed input radiation. When the input radiation is modulated, the processing 16 is after the modulation. In some embodiments of the present invention the processing comprises conversion of the radiation into an electrical signal, which can thereafter be digitized. The processing can also include spectral dispersion of the radiation prior to the conversion into electrical signal. Dispersion is advantageous because it generates a group delay in the propagation of the spectral components that comprise the input radiation, at an extent that has a predetermined dependence on the frequency or wavelength of the radiation. The group delay induces a phase delay which can be measured. From the measured phase delay and the known dependence of the group delay on the frequency or wavelength, the spectrum of the input radiation can be obtained. When operation 15 is executed, it is not necessary to measure the phase because, as stated, the transfer function can be reconstructed from its magnitude so that the spectrum of the input radiation can be obtained from the amplitude without measuring the phase. Preprocessing operations suitable for the present embodiments are described in greater detail in the Examples section that follows.

Another advantage of the spectral dispersion is that it allows selecting the desired detection resolution of the measured spectrum. Generally, the resolution is inversely proportional to the derivative of the group delay with respect to the wavelength of the input radiation. The spectral dispersion is typically applied using a dispersive element characterized by a dispersion function D. Thus, by selecting a dispersive element that provides a larger group delay change as a function of the wavelength, and/or a longer dispersive element, the resolution can be improved. As a representative example, when the scanned parameter is the modulation frequency, a predetermined spectral resolution $\delta\lambda$ can be obtained by selecting at least one, more preferably each, of: (i) the scanning bandwidth $\Delta f_{BW}$ of the modulation frequency, (ii) the length L of the dispersive element, (iii) the dispersion function D of the dispersive element, to satisfy the relation $\delta\lambda=(L \cdot D \cdot \Delta f_{BW})^{-1}$, and (iv) a lower bound on the frequency scan (or a lowest frequency in a scan over a discrete set of frequencies) which is at least or about $f_{min}$ defined above.

Optionally, the method proceeds to 17 at which a vector that describes a dependence of a radiation property of the input radiation on the scanned parameter is constructed. Representative examples of radiation properties suitable for the present embodiments include, without limitation, modulation amplitude, modulation phase-change, carrier frequency and polarization of the input radiation. For example, the vector can be a vector of the modulation amplitudes of the radiation, wherein each element of the vector is a value of the modulation amplitude that characterizes the radiation (for example, the modulation amplitude of an electrical signal indicative of the peak-to-peak intensity of the modulated radiation) collated at a different value of the modulation parameter (e.g., a different value of the modulation frequency).

In some embodiments of the present invention, the method constructs two or more vectors at 17, wherein each vector describes the dependence of a different property of the input radiation on the scanned parameter. The property of each of these vectors can be selected from any of the above properties of the input radiation, with the provision that each of the constructed vectors describe the dependence of a different property of the input radiation. Typically, but not necessarily, a vector of modulation amplitudes and a vector of modulation phase-changes are constructed.

The vectors can be constructed based on the collected radiation, e.g., following processing. For example, the processing 14 can include a first set of measurements performed to measure one property (e.g., modulation amplitude) of the input radiation, and a second set of measurements performed to measure another property (e.g., modulation phase-change) of the input radiation, for a respective set of values of the scanned parameter (e.g., modulation frequency). In these embodiments, each set of measurements provides a vector.

One or more of the vector can also be constructed by applying a transformation to another vector. For example, when the method constructs a vector of modulation amplitudes by performing a set of measurements to measure the modulation amplitude, a vector of modulation phase-changes can be constructed by applying a transformation to the vector of modulation amplitudes, without performing a dedicated set of measurements to measure the phase-change.

Conversely, when the method constructs a vector of modulation phase-changes by performing a set of measurements to measure the modulation phase-change, a vector of modulation amplitudes can be constructed by applying a transformation to the vector of modulation phase-changes, without performing a dedicated set of measurements to measure the modulation amplitude. These transformations can be executed, for example, using the Kramers-Kronig relations, which relate between the real and imaginary parts of a complex function, and which can therefore be utilized for calculating a vector of phase-changes from a vector of amplitudes or vice versa, since the phase of a signal can be directly obtained from the imaginary-to-real dependence of the signal.

Optionally and preferably, a map is constructed using the vectors, wherein the map is a representation of a space spanned by the vectors. For example, when two vectors are constructed, the map represents a two-dimensional space spanned by the two vectors. In the case in which the method constructs a vector of modulation amplitudes and a vector of modulation phase-changes, the map can be a phasor map, wherein each map-element corresponds to a pair of values, one value of the pair represents the modulation amplitude and one value of the pair represents the modulation phase-change.

Unless otherwise defined, the use of the term "map" is not to be considered as limited to a visible representation of the space. For example, a map can be stored as binary data in a computer memory or any other computer-readable medium. Yet, in some embodiments of the present invention a map can be transmitted to a display device such as a computer monitor, or a printer, for visualization.

The method proceeds to 18 at which the method identifies the sample, at least partially, or determine changes in the sample, based, at least in part, on the constructed vector or vectors.

The term "at least partial identification," and its deflections is used herein to indicate an identification of at least one of a chemical content, molecular content, molecular structure, a physical structure, mechanical excitation within the sample (e.g., molecular vibrations, phonons), strain, vibration, stress, viscoelastic parameters, elastic moduli, mechanical property, thermal characteristics of the medium, electronic excitation within the sample, and optical spectral content.

The identification or partial identification of the sample can be achieved in more than one way.

In some embodiments of the present invention, a spectrum of the input is calculated radiation using the constructed vector or vectors or using the constructed map (in embodiments in which such map is constructed), wherein the identification or partial identification of the sample or changes in the sample is based on the calculated spectrum.

For example, when the modulation property is a modulation frequency, the spectrum can be obtained by calculating a discrete inverse Fourier transform using the components of the constructed vector in the integration over the frequency. The spectrum can be alternatively or additionally obtained by matrix manipulations. These embodiments are particularly useful when dispersion is applied at 16. In these embodiments, a matrix characterizing a plurality of values of the scanned parameter (e.g., modulation frequency) for each of a plurality of discrete expected frequencies or wavelengths of the input radiation is constructed. The expected frequencies or wavelengths in the matrix can be at any resolution, and can be expressed either explicitly or by means of a descriptor describing the applied dispersion (e.g., group refractive index, group delay, group velocity, etc.). This can then be manipulated using the constructed vector or vectors to obtain the spectrum. In some embodiments of the present invention the sample is identified by utilizing medium-specific functional dependences of amplitudes and phases on the modulation frequency and the carrier frequency of the input radiation. This can optionally and preferably be achieved by constructing the matrix-elements of the matrix such that in each element both the amplitude and the phase vary as a function of both the modulation frequency and the carrier frequency.

Techniques for calculating the spectrum from the constructed vector using inverse Fourier transform and using matrix manipulation are provided in greater detail in the Examples section that follows.

The identification or partial identification of the sample based on the calculated spectrum can be achieved as known in the art of spectroscopy. Generally, peaks in the spectrum are identified and their height, width and/or location (with respect to the frequency axis or frequency shift axis or wavelength axis or wavelength shift axis or wavenumber axis or wavenumber shift axis) are used for characterizing the structure and/or content and/or state of the material.

In some embodiments of the present invention, the constructed vector (or one or more of the constructed vectors, if more than one vector is constructed at 17) is compared to a reference annotated vector. The reference annotated vector is associated with the same radiation property as the vector to which it is compared. For example, when the method constructs at 17 a vector of amplitudes, the reference annotated vector is also a vector of amplitudes, when the method constructs at 17 a vector of phases, the reference annotated vector is also a vector of phases, and so on.

Typically the reference annotated vector is obtained from a database, wherein each entry of the database has a vector and annotation information. The annotation information can be stored separately from the vector (e.g., in a separate file on a computer readable medium). The annotation information can correspond to the substance for which the database vector pertains. For example, an entry of the database can include a vector that has been previously obtained by a method as described herein for a known substance, and the annotation information can be an identification (such as, but not limited to, a chemical formula, a structural formula, a chemical name, an identifying number in a classification system, e.g., a CAS number, etc.) of the known substance.

In some cases the dependence of the deviation of a known spectrum of a substance from its baseline spectral signature on a monitored parameter is known a priori (e.g. dependence of the spectrum of silicon on its stress or temperature, or dependence of the spectrum of a biological tissue or cell on one or more specific physiological changes in the biological tissue or cell). In these cases, such a deviation can be used to monitor changes in the substance.

When a map is constructed from two or more vectors, the map can be compared to a reference annotated map, for the purpose of the identification or partial identification 18. The reference annotated map is associated with the same properties as the map to which it is compared. For example, when the method constructs a phasor map, the reference annotated map is also a phasor map. Typically the reference annotated map is obtained from a database, wherein each entry of the database has a map and annotation information. The annotation information can be stored separately from the map, and can correspond to the substance for which the database map pertains, as further detailed hereinabove.

In some embodiments of the present invention the database includes only frequency domain values, and is devoid of any time domain values. These embodiments are particularly useful in embodiments in which it is desired to determine changes in the sample, without obtaining its spectrum. This is advantageous since in these embodiments it is not required to transform the measured frequency response which is in the frequency domain, to an impulse response which is in the time domain.

In some embodiments of the present invention phase amplification is employed so as to measuring phase shifts that are smaller than what would be possible without phase amplification. In these embodiments, an additional modulated reference signal that does not interact with the sample, is used, where the modulated amplitudes of the additional reference signal and the input radiation are sufficiently close to each other (e.g., the ration between the amplitudes is from about 0.9 to about 1.1), and where the phase difference between the reference signal and the input radiation is sufficiently small or sufficiently close to $\pi$ radians (for example, when the cosine of this phase difference, in absolute value, is more than 0.9 and less than 0.9999). The reference signal and the input radiation are combined, optionally and preferably by linear combination, either electrically or optically. This effects an amplification of the phase difference between the signal after the combination relative to the reference signal. The amplification extent can reach the value of $1/\alpha$, where $\alpha$ is the absolute value of the difference between 1 and the ratio between modulation amplitudes of the signals. More details regarding this technique is found in International Publication No. WO2015/140610, by Applicant, the contents of which are hereby incorporated by reference.

The method ends at 19.

Some embodiments of the present invention provide a method of constructing a database for the identification of substances. The method comprises providing a plurality of substances, each being identified by identifying information. For each substance, output radiation is transmitted to the substance, and input radiation is collected from the substance as further detailed hereinabove. The output and/or input radiation is modulated by a modulation procedure that is characterized by a modulation parameter, and at least one of the modulation parameter and a parameter describing the output radiation is scanned, as further detailed hereinabove. The input radiation is then processed to construct one or more vectors describing a dependence of a radiation property of the input radiation on the scanned parameter, as further detailed hereinabove. The vector and the respective identifying information is then storing in a computer readable medium as a database entry corresponding to the respective substance.

FIGS. 2A-2F are schematic illustration of a spectroscopy system 20 according to some embodiments of the present invention. System 20 can be utilized for executing at least part of the method operations described above. System 20 comprises a radiation probe 22 for transmitting output radiation 24 to a sample 26 and collecting input radiation 28 from sample 26, the input radiation 28 being indicative of interaction between output radiation 24 and sample 26, as further detailed hereinabove. While FIGS. 2A-2F illustrate a configuration in which input radiation 28 is reflected by sample 26, this need not necessarily be the case, since, for some applications, the radiation can be transmitted through the sample.

Radiation 24 is generated by a radiation source 34. For example, radiation source 34 can generate a monochromatic optical radiation, e.g., laser radiation. The construction of probe 22 depends on the type of radiation generated by source 24. For example, when the radiation is optical radiation, probe 22 is an optical probe. Preferably, but not necessarily, probe 22 is devoid of any free-space propagation sections. For example, when probe 22 is an optical probe, it can include one or more optical fibers 30 for guiding the optical radiation through the probe, and optical coupling element 32 (e.g., lenses, beam splitters, optical filters etc.) for coupling the radiation into and out of the optical fiber 30 and optionally for spectrally filtering the radiation. For example, when the system is used for Raman spectroscopy, a Raman probe is used, for efficient collection of the Raman radiation while filtering out the laser excitation radiation, as known in the art. Alternatively, probe 22 can include free space sections and free space spectral filters, such as the free space sections and free space spectral filters of conventional Raman probes.

System 20 also comprises a modulator 36 that modulates output radiation 24 and/or input radiation 28. Modulator 36 can be an absorptive modulator or refractive modulator, an electro-optic modulator, an acousto-optic modulator, a magneto-optic modulator, or the like. Alternatively or in addition, the light source can be directly modulated as further detailed hereinabove. Still alternatively, system 20 can comprise a mechanism 48 that deliver periodic energy to the sample so as to vary, controllably and periodically, one or more physical properties of the sample, as further detailed hereinabove. The delivered periodic energy can effect at least one of a strain, a mechanical vibration, a thermal change, an electrical change and the like. Mechanism 48 can be a mechanical wave source, a power source that applies voltage to the sample, a thermal radiation source that applies thermal radiation applied to the sample, or the like.

Figure 2A:
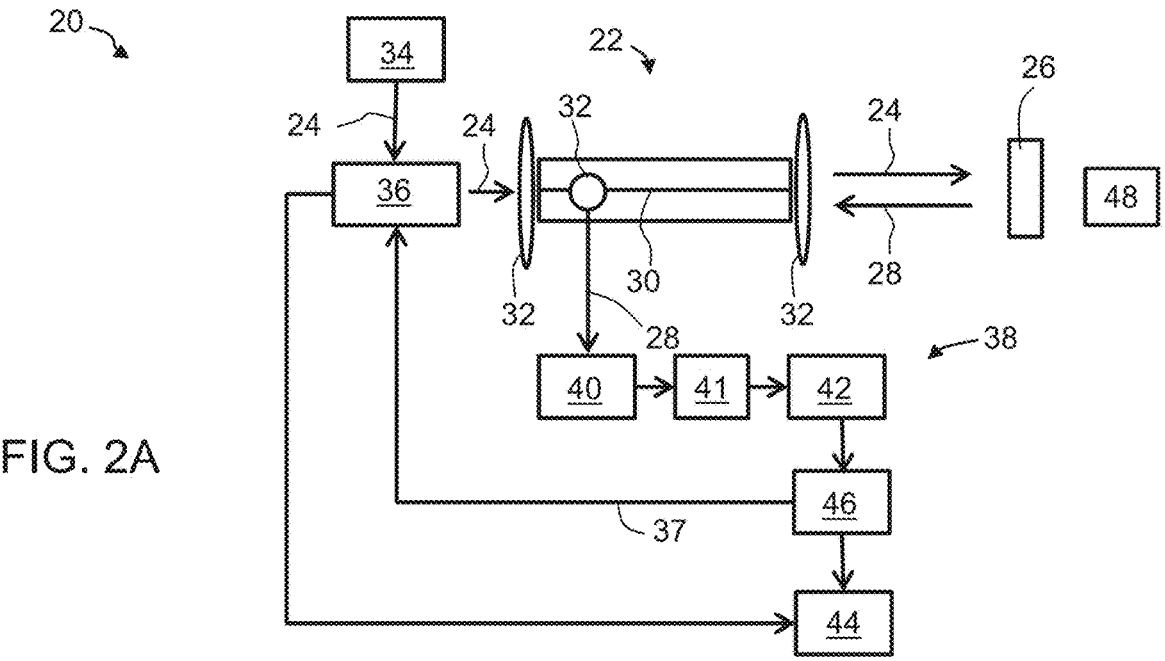
FIGS. 2A-2F are schematic illustration of a spectroscopy system, according to some embodiments of the present invention.
Figure 2B:
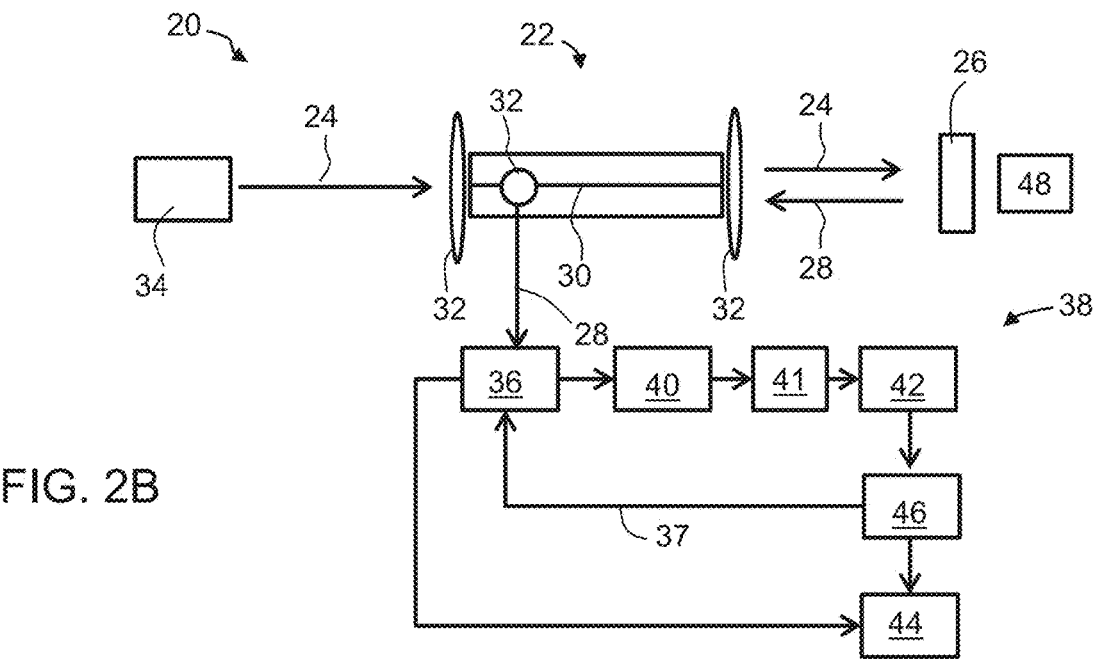
Figure 2C:
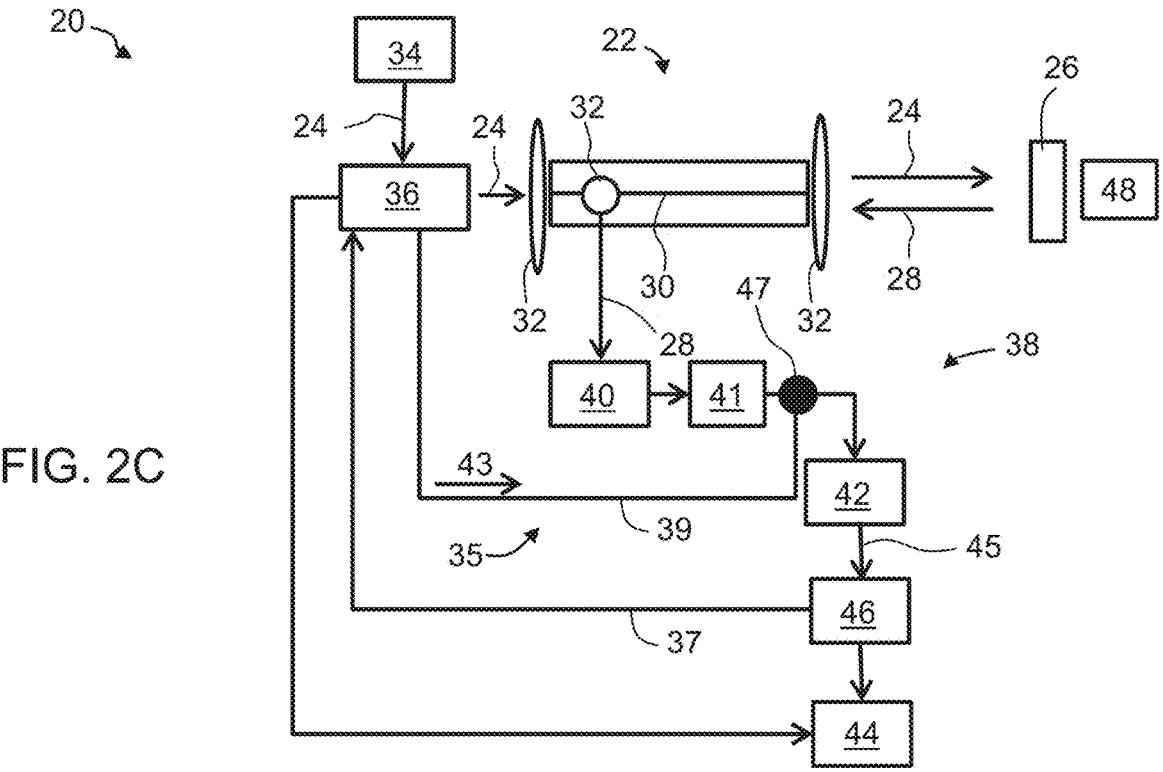
Figure 2D:
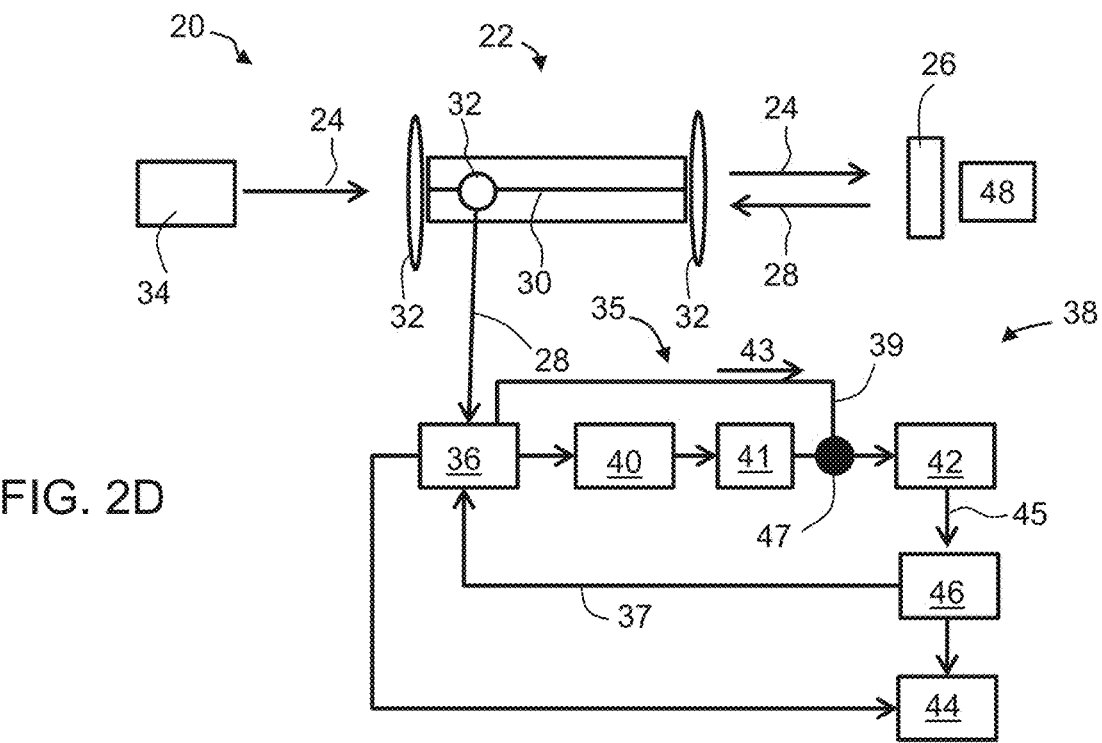
Figure 2E:
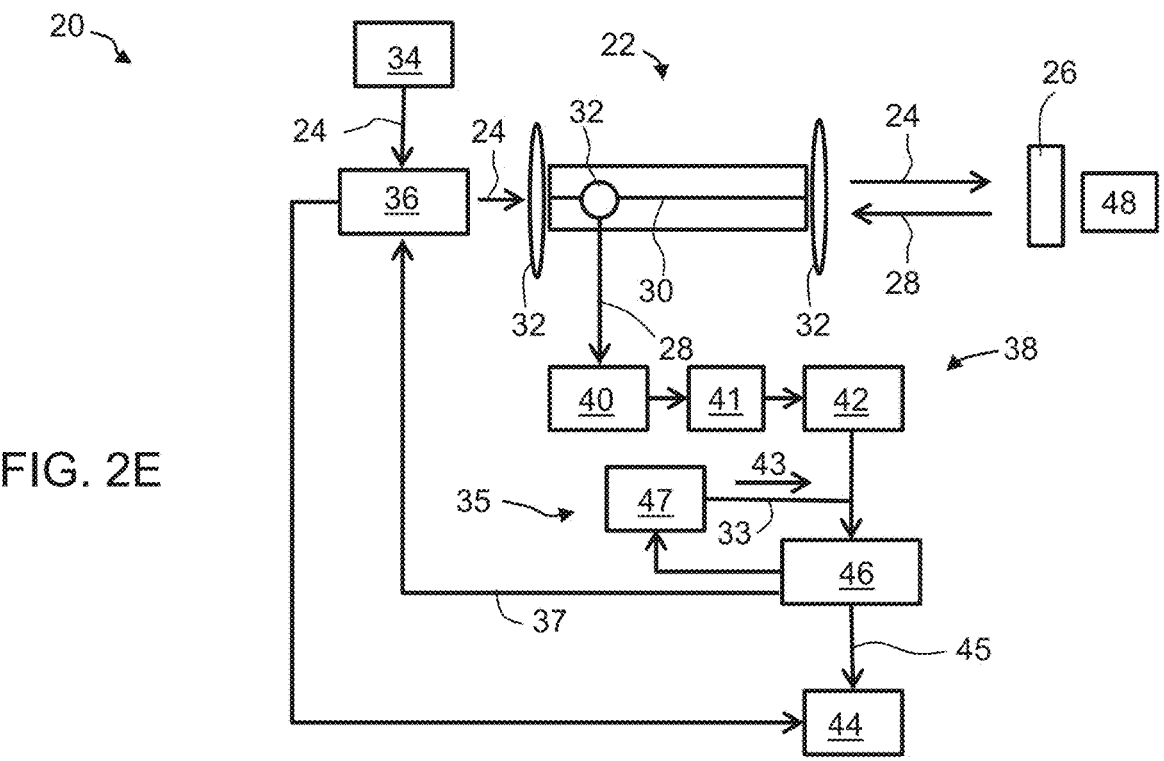
Figure 2F:
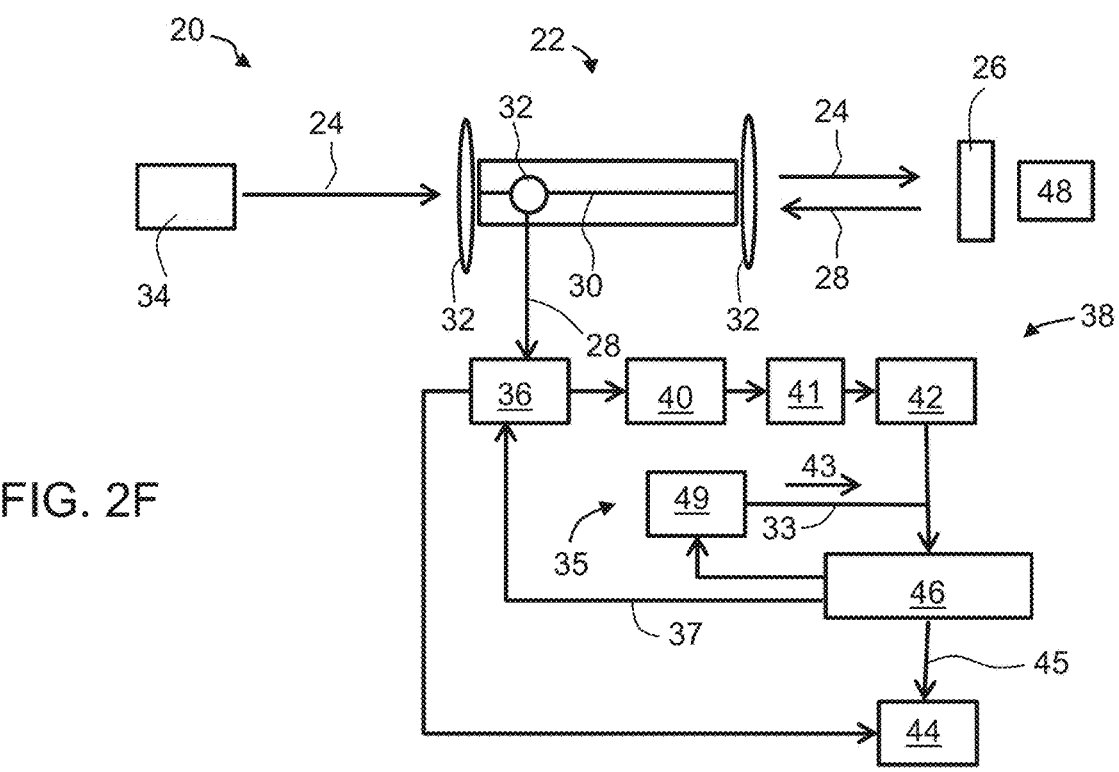

FIGS. 2A, 2C and 2E illustrate embodiments in which modulator 36 modulates radiation 24. In these embodiments, modulator 36 can be an external modulator positioned between source 34 and probe 22, or, alternatively, it can be embedded in source 34 so that source 34 and modulator 36 are provided as a single integrated unit. FIGS. 2B, 2D and 2F illustrate embodiments in which modulator 36 modulates radiation 28. In these embodiments, modulator 36 can be an external modulator that receives radiation 28 from probe 22.

Modulator 36 can be configured or controlled to modulate the respective radiation in scanning manner wherein one or more of the parameters that characterize the modulation (e.g., frequency, amplitude, phase, polarization) is scanned over a predetermined range of the respective parameter. In some embodiments of the present invention modulator 36 is configured or controlled to modulating to modulate the respective radiation in a manner that the modulation is characterized by a discrete set of modulation frequencies, as further detailed hereinabove.

System 20 can further comprise a signal processing system 38 that processes the input radiation 28. Signal processing system 38 can optionally include, for example, a dispersive element 40 that disperses the radiation and a radiation detector 42 that converts the radiation to an electrical signal. These embodiments are particularly useful when the radiation is optical radiation, in which case radiation detector 42 is an optical detector, such as, but not limited to, a PIN photodetector, an avalanche photodiode or the like, and element 40 is an optical dispersive element, such as, but not limited to, an optical fiber, a fiber Bragg grating, a Fabry-Perot filter, and the like. When probe 22 comprises one or more optical fibers 30, they can optionally be dispersive optical fibers in which case it is not required for system 38 to include a dispersive element.

System 38 can optionally and preferably also include an optical amplifier 41 for amplifying the radiation before it enters detector 42. Examples of optical amplifiers suitable for the present embodiments including, without limitation, Raman amplifier, fiber amplifier, e.g., Erbium-doped fiber amplifier, semiconductor optical amplifier, optical parametric amplifier and Brillouin amplifier. In embodiments in which a dispersion fiber is used, the dispersion fiber can also be used as a Raman amplifier or Brillouin amplifier or other type of amplifier.

Signal processing system 38 can also comprise an analyzer system 46, for measuring one or more network parameters, and/or measuring and analyzing the spectrum, of the electrical signal provided by detector 42. Analyzer system 46 optionally and preferably includes at least one of a network analyzer and a spectrum analyzer. For example, analyzer system 46 can measure changes in the amplitude and phase of the electrical signal, which changes can be utilized for constructing the vector as further detailed hereinabove. Analyzer system 46 can alternatively or additionally measure the carrier frequency, carrier power level, harmonics, sidebands, phase noise and/or other characteristics of input radiation 28. In some embodiments of the present invention analyzer 46 is a dedicated electronic circuitry.

In some embodiments of the present invention, analyzer system 46 also controls the modulation parameter(s) employed by modulator 36. In these embodiments, analyzer system 46 transmits a modulation signal 37 to modulator 36. In embodiments in which one or more of the modulation parameter(s) are scanned, the scanning is executed by analyzer system 46. In embodiments in which the modulation is characterized by a discrete set of modulation frequencies, the modulation frequencies are selected by analyzer system 46, preferably pre-selected before operation. Alternatively, the modulation frequencies can be selected during operation, for example, based on the response to one or more frequencies selected before operation. This can be achieved, for example, by employing a machine learning procedure. Also contemplated are embodiments in which the modulator is controlled by an additional controller (not shown) that generates and transmits the modulation signal to modulator 36, and optionally also scan the modulation parameter(s), and/or select a discrete set of modulation frequencies.

In some embodiments of the present invention, system 20 comprises a feedback circuit 35 for combining input radiation 28, following the modulation, with a reference signal 43 to provide a combined signal 45. These embodiments are illustrated in FIGS. 2C-2F. The reference signal 43 can be of the same type as the radiation 28 (e.g., an optical reference signal), in which case it is added before radiation 28 is converted into an electrical signal (for example, at or before the radiation arrives to detector 42, see FIGS. 2B and 2D), or it can be an electrical signal, in which case it is added after radiation 28 is converted into an electrical signal (FIGS. 2E and 2F). When the reference signal is an optical signal, it is preferably a non-dispersed optical signal.

The present embodiments contemplate more than one type of feedback circuit. In embodiments in which reference signal 43 is a non-dispersed optical signal, feedback circuit 35 comprises an optical fiber 39 carrying the signal 43. In the schematic illustrations of FIGS. 2C and 2D, which are not to be considered as limiting, the non-dispersed optical signal 43 is provided by modulator 36 and is combined with the radiation, for example, by a coupler 47, before the radiation arrives at detector 42.

In embodiments in which reference signal 43 is an electrical signal, feedback circuit 35 comprises an electrical line 33 carrying the electrical signal 43. In the schematic illustrations of FIGS. 2E and 2F, which are not to be considered as limiting, feedback circuit 35 is embodied as a feedback loop that shorts the output and input of analyzer system 46, so that reference signal 43 is combined at or before analyzer system 46 with the electrical output from detector 46. Optionally, feedback circuit 35 comprises an electronic attenuation circuit 49 that attenuates the reference signal 43 before combining it with the electrical output from detector 46. The ratio between the power of reference signal 43 and the power of the signal with which it is combined is more than 1 and less than 10, or more than 2 and less than 10. In these embodiments, an electronic attenuation circuit 49 ensures that the power of reference signal 43 is no more than 10 times the power of the signal with which it is combined.

System 38 is optionally devoid of any free-space propagation sections. This is an advantage over detectors currently employed in Raman spectroscopy systems which require free space propagation for spectral separation. Preferably, system 38 has a single spatial channel for all wavelengths of input radiation 28 received by system 38. This is achieved by scanning the modulation parameter or one or more of the parameters characterizing the output radiation, which scanning allows temporal separation of radiation 28 into its components using a single spatial channel. In other words, due to the scanning, different values of the scanned parameter that are applied at different times, can be used for obtaining information regarding respective different components of the radiation, even though all the components occupy the same spatial channel.

System 20 further comprises a data processor 44 that receives a signal indicative of output radiation 28, once modulated, for example, from analyzer system 46, and constructs a vector describing a dependence of a radiation property of the processed input radiation on the scanned parameter, as further detailed hereinabove. Optionally, data processor 44 that receives input, e.g., a modulation signal, from modulator 36. Data processor 44 also identifies or partially identifies or determines changes in the sample 26 based on the vector, as further detailed hereinabove. In some embodiments of the invention, data processor 44 calculates a spectrum of the input radiation using the vector, as further detailed hereinabove. In some embodiments of the invention data processor 44 compares the vector to an annotated vector, as further detailed hereinabove. In some embodiments of the invention data processor 44 accesses a database with entries having vectors and annotation information, and searches the database for an entry having a vector similar to the constructed vector, as further detailed hereinabove. In some embodiments of the invention data processor 44 is configured constructs an additional vector describing a dependence of an additional radiation property of the processed input radiation on the parameter, as further detailed hereinabove. In some embodiments of the present invention data processor 44 calculates a spectrum of the input radiation using the vectors. In some embodiments of the invention data processor 44 constructs a map spanned by the vector, as further detailed hereinabove. In some embodiments of the present invention accesses a database with entries having maps and annotation information, and searches the database for an entry having a map similar to the constructed map, as further detailed hereinabove. In some embodiments of the present invention the parameter comprises modulation frequency, the vector is a vector of amplitudes describing a dependence of amplitude of the input radiation on the modulation frequency, and data processor 44 employs transformation to the vector of amplitudes to provide a vector of phases, as further detailed hereinabove. In some embodiments of the invention the parameter comprises modulation frequency, the vector describes a dependence of a phase of the input radiation on the modulation frequency, and data processor 44 constructs an additional vector describing a dependence of amplitude of the processed input radiation on the modulation frequency as further detailed hereinabove. In some embodiments of the invention the parameter comprises modulation frequency and data processor 44 determines changes in at least one property of the sample based on the vector, in a frequency domain and without transforming said vector to a time-domain. In some embodiments of the invention the parameter comprises modulation frequency and data processor 44 identifies or at least partially identifies the sample based on medium-specific functional dependences of amplitudes and phases on the modulation frequency and a carrier frequency of the input radiation, as further detailed hereinabove.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral)

within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Light Dispersion

When a modulated, e.g., sinusoidally modulated, light beam at optical wavelength $\lambda$ propagates through a dispersive medium, the modulation envelope of the beam undergoes a group delay $$\tau_g(\lambda) = \frac{L}{c}\left(n - \lambda \frac{dn}{d\lambda}\right) \equiv L\beta_1(\lambda),$$

where L is the length of the dispersive medium, and $\beta_1(\lambda)$ is characteristic to the medium and is generally known. Typically, a dispersive medium or element is characterized by a dispersion function D which describes the dependence of the group delay on the optical wavelength $$D(\lambda) = \frac{1}{L}\frac{d\tau_g(\lambda)}{d\lambda} = -\frac{2\pi c}{\lambda^2}\frac{d^2\beta}{d\omega^2}$$

where $\omega$ is the optical frequency in rad/s and $$\beta = nk_0 = n\frac{\omega}{c}$$

is the optical propagation constant in the medium.

Without loss of generality, it is assumed herein that the modulation is sinusoidal. For a sinusoidal modulated monochromatic optical field at optical wavelength $\lambda$, the AC portions of the optical field entering and exiting the dispersive element can be expressed, respectively, as $\cos(\Omega t) e^{i\omega t}$, and $A \cdot \cos(\Omega t - \vartheta_g(\lambda)) e^{i\omega t}$, where $\vartheta_g(\lambda) = \Omega \cdot \tau_g(\lambda)$ is the phase delay on the modulation envelope, and where $\Omega$ is the modulation angular frequency ($\Omega = 2\pi f$, f being the modulation ordinary frequency).

Since the modulation angular frequency $\Omega$ and the dependence of the group delay $\tau_g$ on the wavelength $\lambda$ of the optical field are known, by measuring the phase delay $\vartheta_g$, information regarding the wavelength of the optical field can be obtained.

Phasor Map

Consider a scattered optical field having a spectrum $S(\lambda)$ which is to be determined, for example, for identifying or partially identifying a sample, off which the optical field has been scattered. The spectrum is within the range $\lambda \in [\lambda_1, \lambda_N]$.

The optical field is modulated at a frequency $f_j$, optionally and preferably within the RF range, either before or after scattering as further detailed hereinabove. The scattered and modulated optical field passes through a dispersive element characterized by a predetermined dispersion function $D(\lambda)$.

The ith component of the optical field exits the dispersive element as $$A_i(\lambda_i) \cdot \cos(2\pi f_j t - \vartheta_g(\lambda_i, f_j)) e^{i\omega_i t} \qquad (EQ.\ 1)$$

where $\lambda_i$ is the wavelength of the ith component and $A_i(\lambda_i)$ is proportional to the spectral amplitude at wavelength $\lambda_i$ of the sample. The dispersed optical field is then detected by a detector, providing a signal $B(f_j)$ which can be written, without loss of generality in polar notation, as:

$$B(f_j) = \int A(\lambda) \cdot \exp[-i2\pi\tau_g(\lambda)f_j] d\lambda \qquad (EQ.\ 2)$$

where the definition $\vartheta_g(\lambda, f) = 2\pi f \cdot \tau_g(\lambda)$ was used, and the integral is taken over the spectral rage of the spectrum ($\lambda_1 \leq \lambda_i \leq \lambda_N$, in the present Example.

By scanning over a set of frequencies within the range $\lambda_1 \leq \lambda_i \leq \lambda_N$, a complex phasor map $B(f) = |B(f)|_{i\zeta(f)}$ consisting of the set of amplitudes $|B(f)|$ and phases $\zeta(f)$ can be recorded.

Calculation of Spectrum by Inverse Fourier Transform

In the following, the index i is dropped for clarity of presentation. Starting from EQ. (2) above, an inverse Fourier transform is applied to B(f), resulting in the signal b(t):

$$b(t) = \int_{-\infty}^{\infty} B(f) \cdot \exp(i2\pi ft) df = \qquad (EQ.\ 3)$$

$$\int_{-\infty}^{\infty} \int A(\lambda) \cdot \exp[-i2\pi f \tau_g(\lambda)] d\lambda \cdot \exp(i2\pi ft) df =$$

$$\int A(\lambda) \int_{-\infty}^{\infty} \exp\{i2\pi f[t - \tau_g(\lambda)]\} df d\lambda = \int A(\lambda)\delta[t - \tau_g(\lambda)] d\lambda$$

Therefore, $$b[t = \tau_g(\lambda)] = A(\lambda) \qquad (EQ.\ 4)$$

Since for a given dispersion element the group delay $\tau_g(\lambda)$ is known, the desired spectrum can be calculated as:

$$A(\lambda) = b[L\beta_1(\lambda)] \qquad (EQ.\ 5)$$

Calculation of Spectrum by Matrix Manipulation

In this technique, a matrix M, which characterizes the dispersion element is constructed, optionally and preferably in advanced, for a total of at least N/2 frequencies, where N is the total number of spectral resolvable points to be determined in the spectrum. A representative example of a matrix M is:

$$M \equiv \begin{pmatrix} \cos(\vartheta_g(\lambda_1, f_1)) & & \cos(\vartheta_g(\lambda_N, f_1)) \\ \sin(\vartheta_g(\lambda_1, f_1)) & \cdots & \sin(\vartheta_g(\lambda_N, f_1)) \\ \vdots & \ddots & \vdots \\ \cos(\vartheta_g(\lambda_1, f_{N/2})) & \cdots & \cos(\vartheta_g(\lambda_N, f_{N/2})) \\ \sin(\vartheta_g(\lambda_1, f_{N/2})) & & \sin(\vartheta_g(\lambda_N, f_{N/2})) \end{pmatrix}$$
(EQ. 6)

In the example provided in EQ. 6, all matrix-elements in M have the same amplitude. However, this need not necessarily be the case, since, for some applications, it is advantageous to employ matrix-elements with different amplitudes. For example, two or more matrix-elements that correspond to different modulation frequencies $\Omega_j$, more preferably any two matrix-elements that correspond to different modulation frequencies, may have different amplitudes. Alternatively or, more preferably additionally, two or more matrix-elements that correspond to different carrier frequencies, more preferably any two matrix-elements that correspond to different group indices, may have different amplitudes. Thus, for example, the amplitude G of a peculiar matrix element (i, j) can be expressed as $G(\lambda_i, f_j)$, where $\lambda_i$ and $f_j$ are, respectively, the carrier wavelength and modulation frequency that correspond to this matrix element.

In a representative example, which is not to be considered as limiting, the amplitude $G(\lambda_i, f_j)$ is:

$$A\left(\cos^2\left(\frac{\pi DL}{c}\lambda_i^2 f_j^2\right)\right)$$
(EQ. 7)

The signal B(f) can be written as a vector $\overline{B}=(B_1 \cos(\zeta_1), B_1 \sin(\zeta_1), \ldots, B_{N/2} \cos(\zeta_1), B_{N/2} \sin(\zeta_1))$, where $B_1$, $B_2, \ldots, B_{N/2}$ and $\zeta_1, \zeta_2, \ldots, \zeta_{N/2}$ are, respectively, the amplitudes and phases of the phasor map for the corresponding modulation frequencies $\Omega_1, \Omega_2, \ldots, \Omega_{N/2}$. The desired spectrum $A(\lambda)$ can be represented as a vector $\overline{A}$, whose elements are the desired amplitudes $A_1(\lambda_1), A_2(\lambda_2), \ldots, A_N(\lambda_N)$, at each of the optical wavelengths $\lambda_1, \lambda_2, \ldots, \lambda_N$. The matrix M (EQ. 6) provides the relation between the vectors $\overline{A}$ and $\overline{B}$:

$$M\begin{pmatrix} A_1 \\ A_2 \\ \cdot \\ \cdot \\ \cdot \\ A_N \end{pmatrix} = \begin{pmatrix} B_1\cos(\zeta_1) \\ B_1\sin(\zeta_1) \\ \cdot \\ \cdot \\ \cdot \\ B_{N/2}\cos(\zeta_{N/2}) \\ B_{N/2}\sin(\zeta_{N/2}) \end{pmatrix}$$
(EQ. 8)

This equation can be solved by matrix manipulation to provide the vector $\overline{A}$.

Experimental

Spontaneous Raman scattering is a process whereby a small percentage of optical radiation that illuminates a material is scattered by molecules consisting of chemical bonds that are in some vibrational state. The frequency of the scattered radiation includes downshifted (Stokes) and upshifted (anti-Stokes) components. Typically, the Stokes components having reduced quantum energy relative to the excitation photons, are much stronger as a result of the fact that at room temperature the population state of a molecule is principally in its ground vibrational state. The amount of the downshift depends upon the particular vibrational modes of the specific active molecular bonds, so that a spectrum of the scattering is essentially a highly specific "signature" of the molecular composition of the material. Not all vibrations will be observable with Raman spectroscopy (depending upon the symmetry of the molecule.) but sufficient information is usually present to enable a very precise characterization of the molecular structure. Many of the characteristic Stokes shifts for the different bonds (e.g. C—H, C—O, Metal-O etc.) are tabulated in the literature.

The Raman scattering cross-section is very small, so that in average only about 1 in $10^7$ photons undergoes Stokes scattering. Some embodiments of the present invention have been utilized for identifying a material experiencing Raman scattering.

Figure 3A:
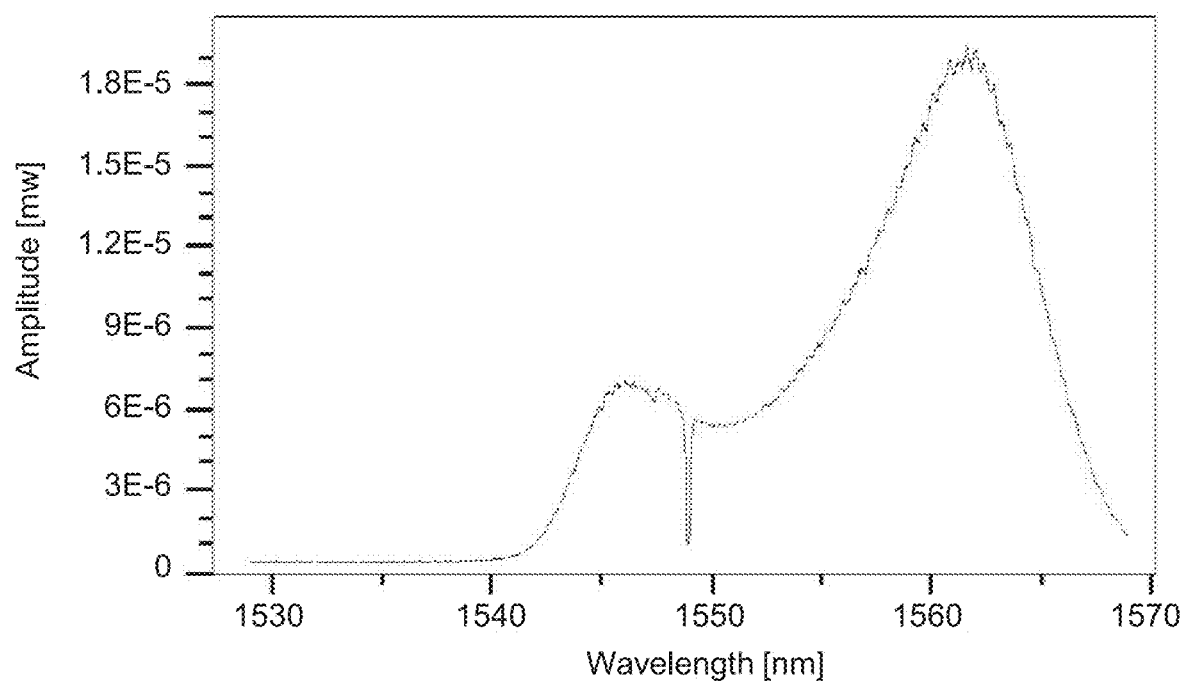
FIG. 3A shows an Amplified Spontaneous Emission source passing through a Bragg filter spectrum measured using an optical spectrum analyzer, in experiments performed according to some embodiments of the present invention.

FIG. 3A shows an optical spectrum measured using an optical spectrum analyzer. This spectrum was obtained by taking an output of an Erbium Doped Fibre Amplifier (EDFA) and transmitting it through a fiber Bragg grating (FBG) having a bandwidth of 0.3 nm.

Figure 3B:
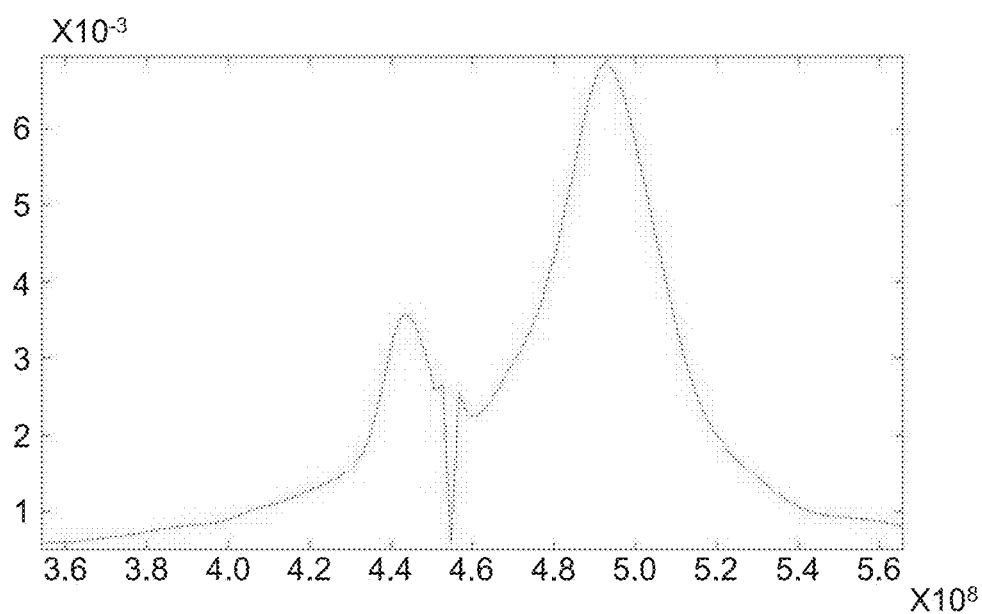
FIG. 3B shows a reconstructed version of the spectrum of FIG. 3A, as obtained according to some embodiments of the present invention.

FIG. 3B shows a spectrum as obtained according to some embodiments of the present invention by scanning a modulation frequency over a bandwidth of 2 GHz, and using a discrete inverse Fourier Transform for calculating the spectrum. As demonstrated, the technique optionally and preferably successfully reconstructs the physical spectrum.

Figure 4A:
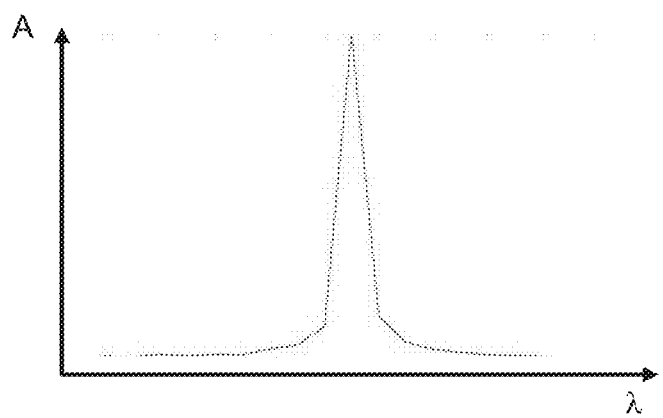
FIGS. 4A-4D show spectra reconstructed according to some embodiments of the present invention using different modulation scanning bandwidths.
Figure 4B:
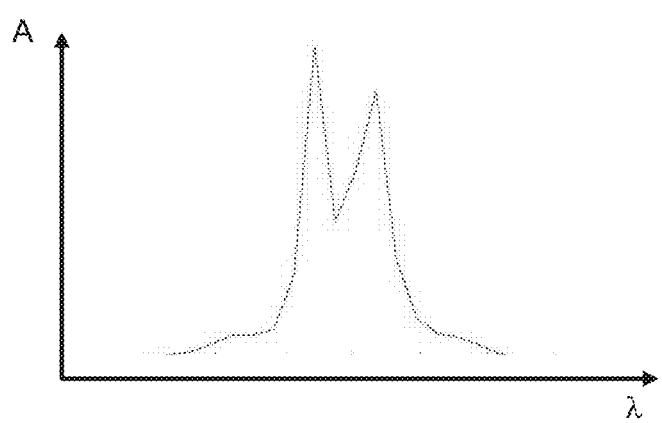
Figure 4C:
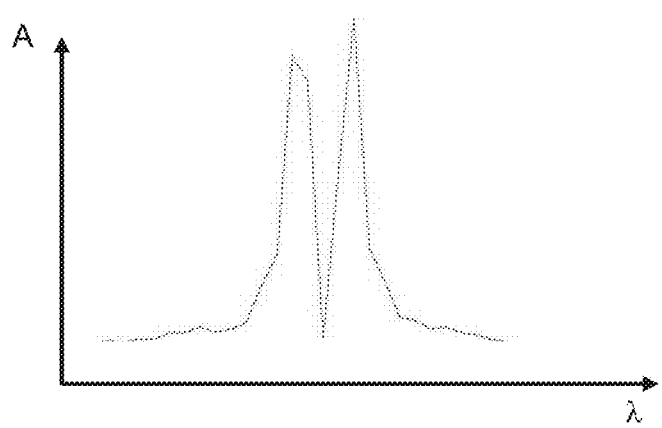
Figure 4D:
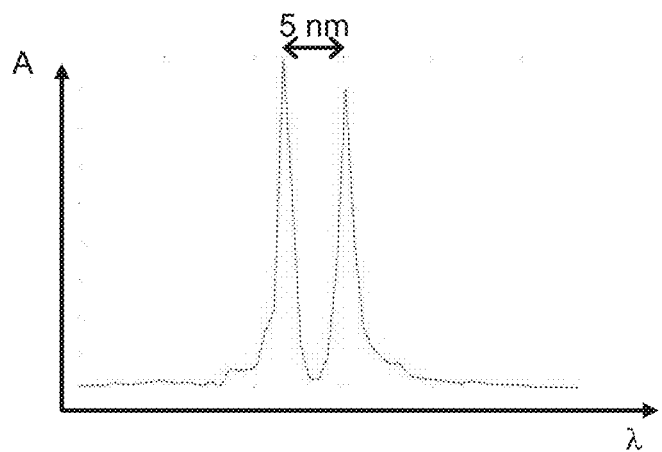

In the present example, in which the scanned parameter is the modulation frequency and in which a dispersive element having length L and dispersion function D is employed, the resolution $\delta\lambda$ of the reconstructed spectrum satisfies the relation $\delta\lambda=(L \cdot D \cdot \Delta f_{BW})^{-1}$. The ability of the technique of the present embodiments to select the resolution of the reconstructed spectrum by a judicious selection of the scanning bandwidth $\Delta f_{BW}$ the modulation frequency is illustrated in FIGS. 4A-4D. FIG. 4A shows a spectrum as obtained according to some embodiments of the present invention by scanning a modulation frequency over a bandwidth of $\Delta f_{BW}=100$ MHz, providing a resolution $\delta\lambda$ of about 13 nm, and using a discrete inverse Fourier Transform for calculating the spectrum. At this resolution, a single peak is observed in the spectrum. FIG. 4B is the same as FIG. 4A, except that the scanning was over bandwidth of $\Delta f_{BW}=600$ MHz, providing a resolution $\delta\lambda$ of about 2 nm. As shown, the increment of the bandwidth improved the resolution, to allow the detection of the existence of two peaks. At this resolution, it is difficult to measure the width of each peak. FIG. 4C is the same as FIG. 4A, except that the scanning was over bandwidth of $\Delta f_{BW}=900$ MHz, providing a resolution $\delta\lambda$ of about 1.5 nm. At this resolution, the width of each peak is measurable. FIG. 4D is the same as FIG. 4A, except that the scanning was over bandwidth of $\Delta f_{BW}=2$ GHz, providing a resolution $\delta\lambda$ of about 0.7 nm. At this resolution, the width of each peak is measurable more accurately.

Figure 5:
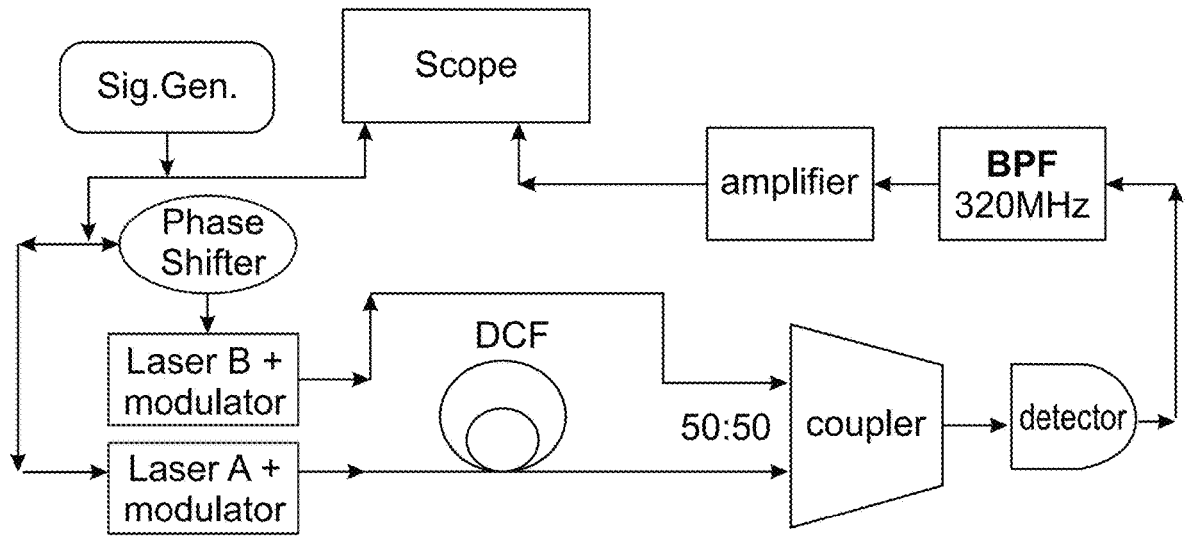
FIG. 5 is a schematic illustration of an experimental setup designed according to some embodiments of the present invention for studying the effect of phase amplification on spectroscopy.
Figure 6:
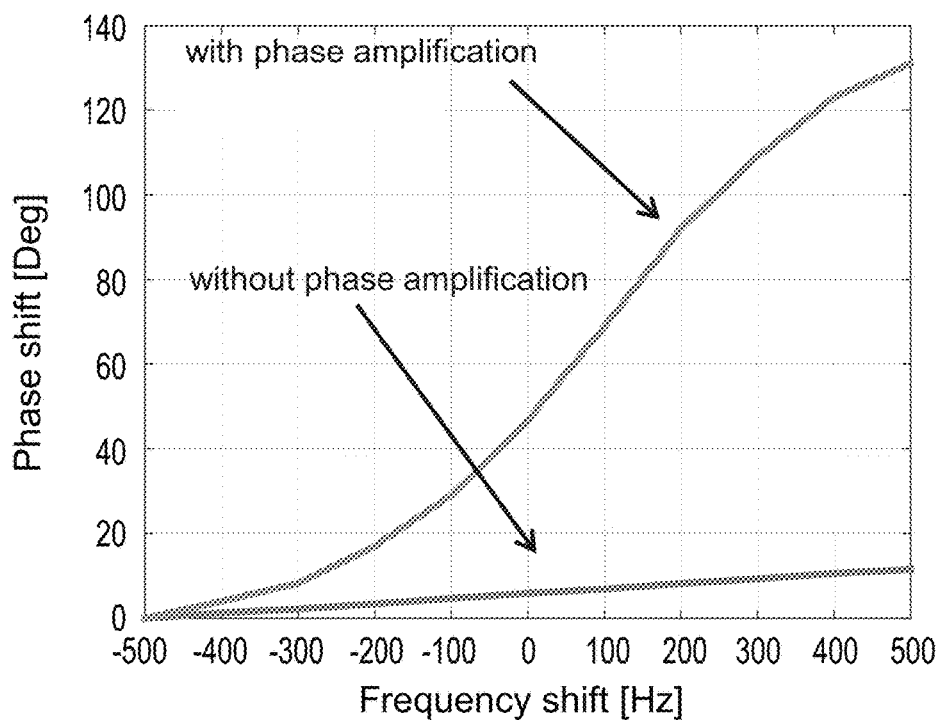
FIG. 6 is a graph of a phase shift as a function of a frequency shift, as obtained in experiments performed according to some embodiments of the present invention.

In some embodiments of the present invention phase amplification is employed so as to measuring phase shifts that are smaller than what would be possible without phase amplification. FIG. 5 is a schematic illustration of an experimental setup designed for studying the effect of phase amplification on the spectroscopy of the present embodiments. In FIG. 5, laser A simulated the input radiation 28 (see FIGS. 2A-2F), and Laser B was a phase shifted reference signal, to be combined with the input radiation to effect the phase amplification as delineated hereinabove and in accordance with the teachings of International Publication No. WO2015/140610, the contents of which are hereby incorporated by reference. The combination between Laser A and laser B was by a 50:50 coupler. Laser A was transmitted by a dispersion compensation fiber (DCF) into the coupler, and laser B circumvented the DCF. The combined laser was directed to a detector. The output of the detector was an electrical signal that was filtered by a bandpass filter (BPF) at 320 MHz, and amplified by an amplifier. The Experimental results are shown in FIG. 6 which is a graph of the phase shift in degrees as a function of the frequency shift. As shown the phase shift amplification technique successfully amplifies the phase shift.

Phase-Less Incoherent Optical Frequency Domain Spectroscopy

In this example, a technique for Incoherent Optical Frequency Domain Spectroscopy (I-OFDS), which does not require measurements of the RF phase spectrum in order to reconstruct the optical spectrum is demonstrated. The technique is based on the addition of a reference signal, in accordance with some embodiments of the present invention.

When RF-modulated light is transmitted through a dispersive fiber, interacts with a sample and detected, the amplitude and phase response of the RF envelope of the detected light can be monitored. An inverse Fourier transform of the RF response results in a time distribution, which is proportional to the optical spectrum distribution. This approach is referred to in this example as Incoherent Optical Frequency Domain Spectroscopy or I-OFDS. The reconstruction of the time domain impulse response calls for a measurement of the complex RF transfer function, including both the magnitude and phase response.

Following is a mathematical formulation of I-OFDS. It is desired to determine the optical power spectrum $S(\omega)$ of an optical beam having a total power $P_0=\int S(\omega)d\omega$. The beam is first modulated with a sinusoidal signal originating from a (vector network analyzer) VNA and which is step-scanned over a predetermined set of modulation frequencies $f_i=\Omega_i/2\pi$, f being the modulation frequency in Hz, so that the modulated signal power is:

$$P(t)=P_0[1+m\cos(\Omega_i t)]=P_0+P_{AC}(t) \quad \text{(EQ. 9)}$$

where $P_{AC}(t)$ refers to the AC term of the signal and m is the modulation index. The modulated signal is directed through the dispersive fiber and detected with a photodiode. The RF signal output at frequency $\Omega_i$ returns to the VNA.

Consider a single optical spectral component at $\omega_0$, i.e. $S(\omega_0)$. The AC term of the signal gains a phase equal to $\Omega_i\tau_g(\omega_0)$, where $\tau_g(\omega_0)$ is the group delay due to the dispersion. In addition, the signal is attenuated due to losses in the optical fiber and due to amplitude fading of double-sideband modulation caused by chromatic dispersion. The AC term of the output signal is:

$$P_{AC,out}(t,\omega_0,\Omega_i)=\eta S(\omega_0)\cos\lfloor\Omega_i t-\Omega_i\tau_g(\omega_0)\rfloor \quad \text{(EQ. 10)}$$

where $\eta$ is the attenuation coefficient, and in is typically a function of the optical frequency and the RF frequency. When the spectral width of the signal is sufficiently narrow and the maximum modulation frequency is sufficiently low such that the fading effect is negligible, $\eta$ can be approximated as a constant.

The RF frequency can be scanned over a range of values, and the VNA can provide the attenuation and the phase shift of the RF signal for each frequency. After calibration, the result of the measurement is a set of phasors which characterizes the RF frequency response of the fiber, where the $i^{th}$ phasor at $\Omega_i$ is:

$$P(\omega_0,\Omega_i)=\eta S(\omega_0)e^{-i\Omega_i\tau_g(\omega_0)} \quad \text{(EQ. 11)}$$

In the case of a broad band signal, the measured phasor is:

$$P(\Omega_i)=\eta\int S(\omega)e^{-i\Omega_i\tau_g(\omega)}d\omega \quad \text{(EQ. 12)}$$

Applying an inverse Fourier transform to the entire phasor spectrum $P(\Omega)$ provides a time distribution p(t) equivalent to the RF impulse response:

$$P(t)=\frac{1}{2\pi}\int P(\Omega_i)e^{i\Omega t}d\Omega=\eta\int S(\omega)\delta(t-\tau_g(\omega))d\omega \quad \text{(EQ. 13)}$$

Since for a given dispersive fiber the group delay function $\tau_g(\omega)$ is known, the entire desired spectrum $\hat{S}(\omega)$ can be derived by:

$$\hat{S}(\omega)=p(t=\tau_g(\omega))/\eta \quad \text{(EQ. 14)}$$

The present Inventors found that two effects can introduce distortion and a reduce the resolution. Firstly, the procedure practically employs calls an inverse Fourier analysis over a finite bandwidth, which introduces a distortion on the time response due to convolution with a sinc function. Secondly, the upper modulation frequency is bounded because of the fading effect which may be is significant, particularly at high frequencies. This reduces the resolution of the measurement since the time interval of a discrete Fourier transform is dictated by the reciprocal of the frequency-domain bandwidth.

This example demonstrates I-OFDS which does not require phase measurements and which is capable to reconstruct the impulse response with improved spatial resolution (e.g., higher than 0.2 nm) and improved sensitivity (e.g., higher than −20 dB). This technique is referred to as phase-less I-OFDS.

Assume, without loss of generality, a casual system with the transfer function $H(\Omega)=u(\Omega)+iv(\Omega)$. By adding a real component C that is constant for all $\Omega$ a new transfer function $\hat{H}(\Omega)$ is obtained, the magnitude of which satisfying:

$$|\hat{H}(\Omega)|=\sqrt{[u(\Omega)+C]^2+v(\Omega)^2} \quad \text{(EQ. 15)}$$

By choosing $C \gg u(\Omega)$, $v(\Omega)$, the approximate value of the real part of the transfer function, $\tilde{u}(\Omega)$, can be expressed as:

$$\tilde{u}(\Omega)=\frac{|\hat{H}(\Omega)|^2-C^2}{2C} \quad \text{(EQ. 16)}$$

By measuring $|\hat{H}(\Omega)|^2$ and inserting the known value for C, $\tilde{u}(\Omega)$ can be determined from the EQ. 16. The approximate impulse response $\tilde{h}(t)$ can be derived as:

$$\tilde{h}(t)=2\cdot F^{-1}\{\tilde{u}(\Omega)\}\cdot U(t) \quad \text{(EQ. 17)}$$

where U(t) is the Heaviside step function.

Figure 7:
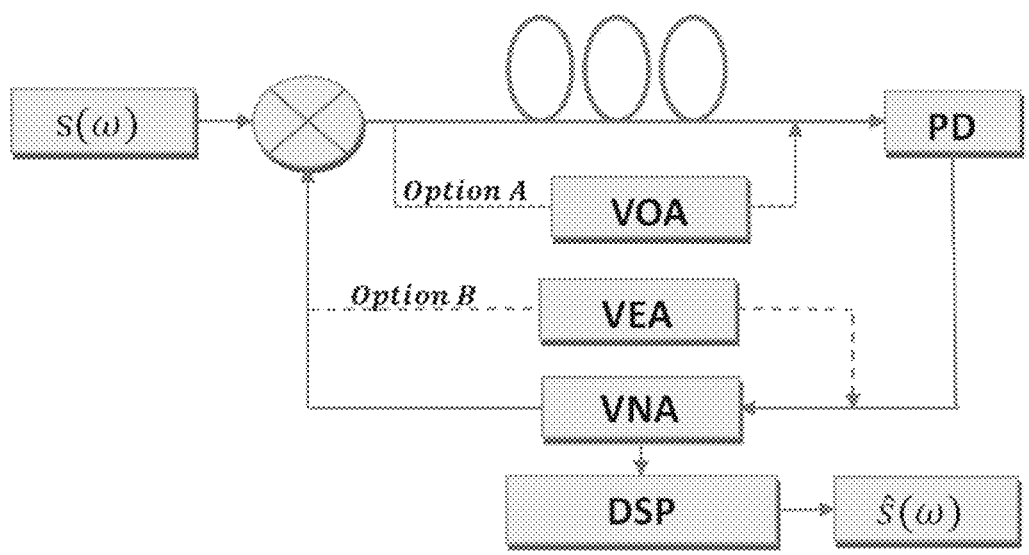
FIG. 7 is a schematic illustration of two experimental setups constructed in accordance with some embodiments of the present invention to study the performance of a phaseless Incoherent Optical Frequency Domain Spectroscopy (I-OFDS)

In practice, the addition of a constant component can be realized optically by adding an optical reference line parallel to the dispersive fiber, or electronically by shorting the input and output of the VNA. FIG. 7 is a schematic illustration of two experimental setups constructed to study the performance of the phase-less I-OFDS of the present embodiments. In FIG. 7, VOA is an abbreviation for variable optical attenuator, VEA is an abbreviation for variable electronic attenuator, option A (dashed line) corresponds to an implementation in which the constant component is realized optically by adding an optical reference line parallel to the dispersive fiber, and option B (dashed line) corresponds to an implementation in which the constant component is realized electronically by shorting the input and output of the VNA.

Figure 8:
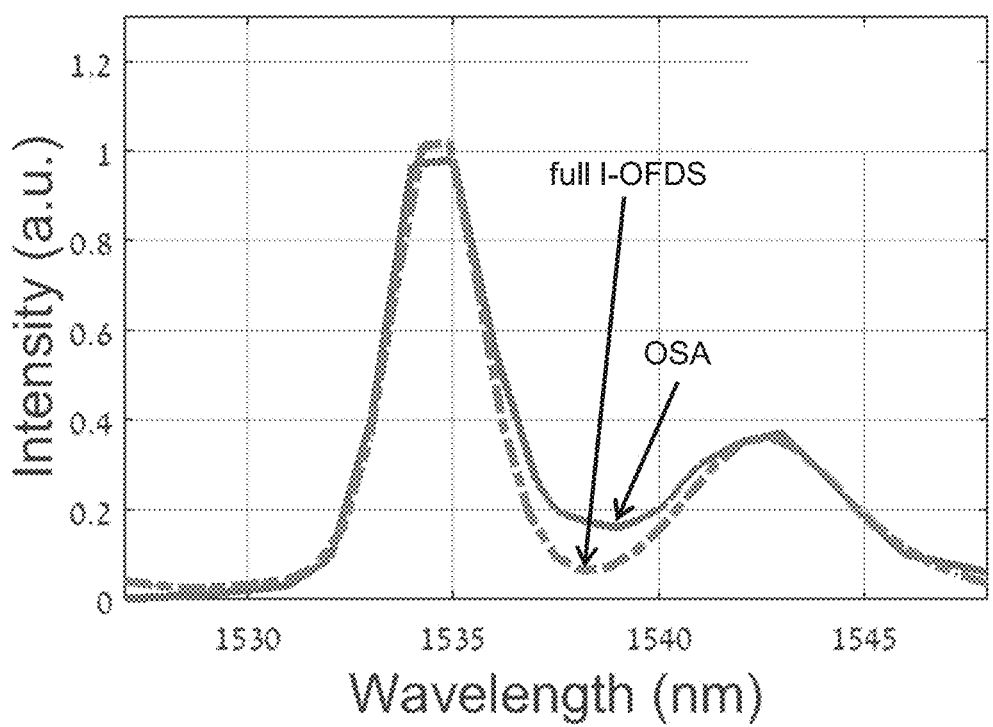
FIG. 8 shows a spectrum measured by an optical spectrum analyzer (OSA) and a spectrum reconstructed by I-OFDS, as obtained in experiments performed according to some embodiments of the present invention.

In this example, an amplified spontaneous emission (ASE) source was used as the signal under test. The spectrum of the ASE was measured with a standard grating-based optical spectrum analyzer (OSA; Hewlett Packard model HP86142a), and is shown in FIG. 8. The optical spectrum had two main lobes at 1535 nm and 1543 nm and a total bandwidth of 20 nm.

In a first experiment, a full I-OFDS technique was employed wherein the full RF magnitude and phase response were measured. The laser output was amplitude modulated with a Mach-Zehnder modulator driven by a swept stepwise RF signal controlled by the network analyzer. The total RF span was 1.2 GHz (starting from 10 MHz) and the internal IF filter bandwidth was set to 1 kHz. The modulated signal was directed to a dispersion compensation fiber (DCF) which had a total dispersion of $$-800\frac{\text{ps}}{\text{nm}},$$

and after detection the RF signal returned to the network analyzer which measured the $S_{21}$ parameter. After applying an inverse FFT on the results, the optical spectrum was computed as described in EQ. 14, and is also shown in FIG. 8.

In a second experiment, the phase-less I-OFDS was employed by adding a parallel reference line. For an optical reference signal, optical couplers were inserted before and after the DCF, allowing a portion of the optical signal to circumvent the DCF. A VOA was placed on this line to control the power transmitted through it. For an electrical reference signal, a portion of the VNA's output was fed back to it. The reference power was controlled with a VEA. Both systems were characterized for various power levels of the reference. The estimated real part of the transfer function was derived from the magnitude measurements by using EQ. 16 and the spectrum was reconstructed according to EQ. 17.

Figure 9:
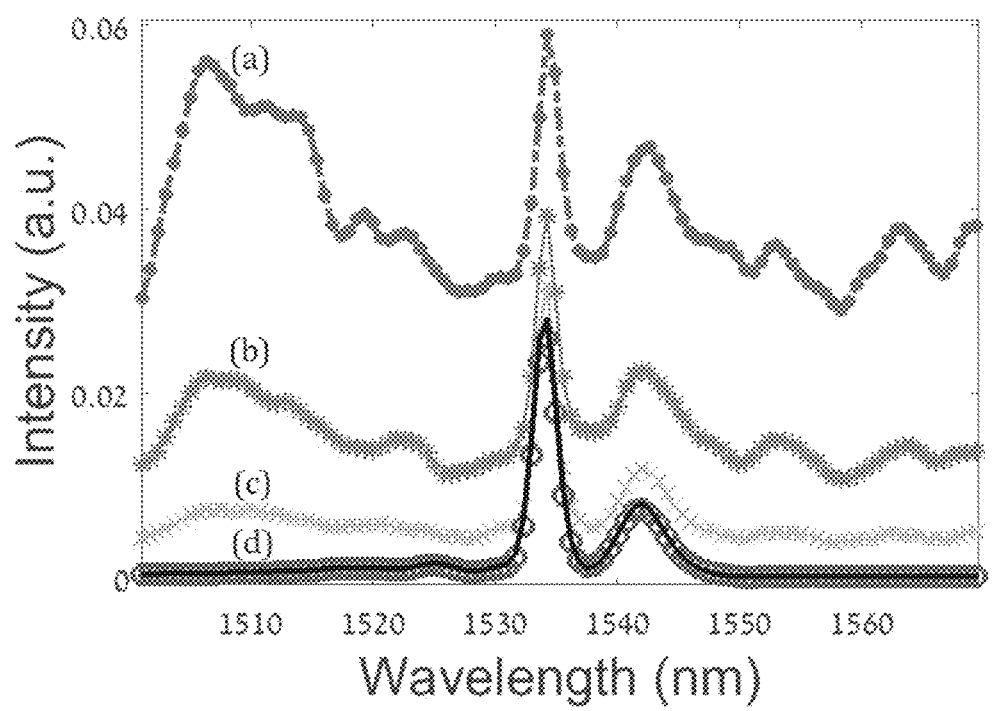
FIG. 9 shows spectra reconstructed by I-OFDS and by phase-less I-OFDS, as obtained in experiments performed according to some embodiments of the present invention.

The absolute power of C was normalized by the DC power $P_0$ of the input signal. The results shown hereinafter refer to a relative coefficient $\hat{C}$ which is defined as $\hat{C} \equiv C/P_0$. FIG. 9 shows the reconstruction of the optical spectrum. The solid thick line corresponds to the full I-OFDS technique. Curves and symbols (a) through (d) correspond to the phase-less I-OFDS technique of the present embodiments, with difference values of: (a) $\hat{C}=0.006$, (b) $\hat{C}=0.007$, (c) $\hat{C}=0.01$, (d) $\hat{C}=1.6$. As shown, as the power of the added component C increased, the reconstructed spectrum converged to the full I-OFDS reconstruction. FIG. 9 demonstrates that the spectrum is reconstructed even at very low values of $\hat{C}$, albeit with distortion. As the power of $\hat{C}$ increases the phase-less I-OFDS reconstruction of the present embodiments merges with the full I-OFDS result.

To estimate the reconstruction accuracy of phase-less I-OFDS in comparison with the full I-OFDS, a relative root-mean-square error parameter E is defined as follows:

$$E = \frac{\|S(\lambda)_f - S(\lambda)_{pl}\|_2}{\|S(\lambda)_f\|_2} 100\% \quad \text{(EQ. 18)}$$

where $S(\lambda)_f$ is the reconstructed spectrum using the full I-OFDS technique, $S(\lambda)_{pl}$ is the reconstruction using the phase-less technique and $$\|f\|_2 = \sqrt{\Sigma |f|^2}$$

is the Euclidean norm of f with the sum taken along the discrete wavelength scale of the spectrum. All acquired spectra were normalized by setting the peak value to be one.

Figure 10:
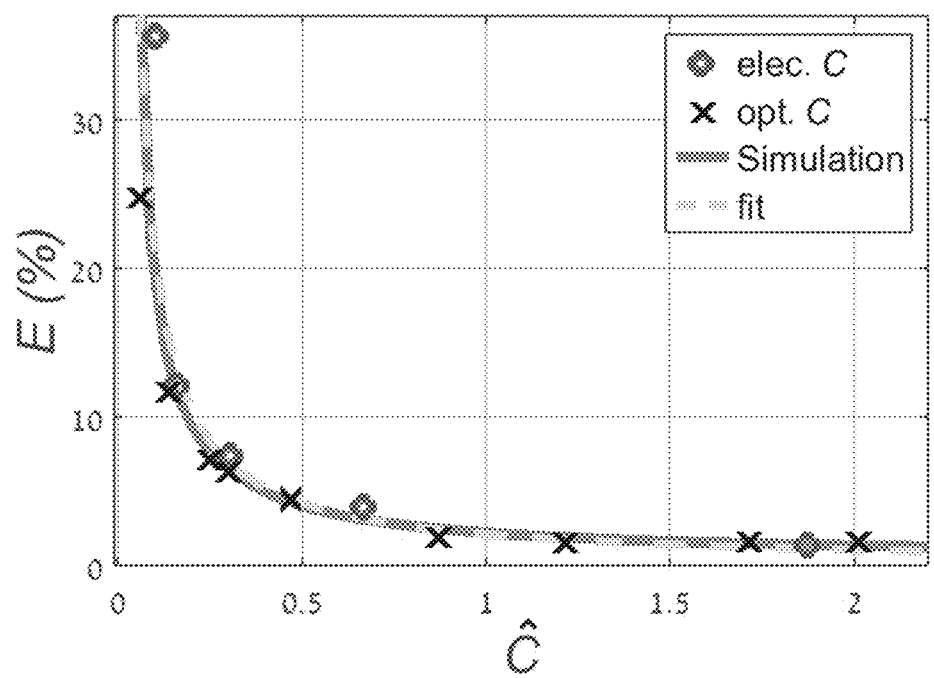
FIG. 10 shows an estimated error E as a function of a normalized constant component added to a real part of a transfer function, as obtained in experiments performed according to some embodiments of the present invention.

FIG. 10 shows the estimated error E as a function of $\hat{C}$ for the electronic reference technique (circles) and the optical reference technique (crosses). The solid line is the result of a simulation in which $\hat{C}$ was added to the original spectrum. As shown in FIG. 10, both the electronic and optical reference techniques have similar dependence on $\hat{C}$, demonstrating that all embodiments in which reference signal is employed can be used and provide adequate results. Further investigation of the error parameter shows an inversely-proportional dependence on $\hat{C}$, leading to a decrease in the error for $\hat{C} \leq 1$. For example, when the power of C equals the power of the signal ($\hat{C}=1$) the estimated error is at a low level of about 1.5%, and for higher values the error is even smaller (e.g., reaching less than 1% at $\hat{C}=3$).

The dependence of the error parameter on C can be written as:

$$E(\hat{C}) \propto \|S(\lambda)_f - S(\lambda)_{pl}\|_2 \propto \|2 \cdot F^{-1}\{u(\Omega)\} \cdot U(t) - 2 \cdot F^{-1}\{\tilde{u}(\Omega)\} \cdot U(t)\|_2$$

$$= \|F^{-1}\{u(\Omega) - \tilde{u}(\Omega)\}\|. \quad \text{(EQ. 19)}$$

According to Parseval's theorem:

$$\|F^{-1}\{u(\Omega) - \tilde{u}(\Omega)\}\| = \|u(\Omega) - \tilde{u}(\Omega)\|_2 = \frac{\||H(\Omega|^2\|_2}{2C} \quad \text{(EQ. 20)}$$

EQs. 19 and Eq. 20, lead to:

$$E(\hat{C}) \propto 1/\hat{C} \quad \text{(EQ. 21)}$$

In accordance with EQ. 21, the experimental results were fitted to the function $$k \cdot \frac{1}{\hat{C}}$$

using the least-square-error method, and the best-fit was obtained for k=2.1. This fit is shown as a dashed line in FIG. 10.

The value of $\hat{C}$ is preferably not too high so as not to add a noise, and not to substantially increase the required dynamic range. In some embodiments of the present invention $\hat{C}$ is from about 1 to about 5, more preferably from about 2 to about 4, e.g., about 3.

In applications in which it is difficult to measure a full complex function, Kramers Kronig (KK) relations can be applied in order to derive the imaginary part of a casual function from its real part, and vice-verse. When the KK procedure is applied on the logarithm of a complex function, the magnitude and phase of the original function corresponds to the real and the imaginary parts of the logarithm respectively. While the phase of the original function can be derived by measurements of the magnitude, it was realized by the present inventors that in some cases the results are not optimal, for example, due to zeroes in the logarithm function, and due to lack of causality in some cases. The phase-less I-OFDS procedure of the present embodiments is particularly useful for these cases. With the aid of the reference line, the real part of the RF spectrum is derived from the amplitude spectrum, and then the causal impulse response follows as an inverse transform multiplied by a step function. Thus, the reference signals can be utilized for obtaining phase measurements. If desired, a Fourier transform can be applied to the result to produce the full $H(\Omega)$.

While the embodiments above where described with a particular emphasis to the real part, it is to be understood that a similar procedure can alternatively be applied on the imaginary part, for example, by adding a phase shift of $\pi/2$ to the reference arm. This is equivalent to adding a purely imaginary constant iC.

This example demonstrated the phase-less I-OFDS of the present embodiments, both for the case in with the reference signal is optical and for the case in which the reference signal is electric. The experimental results demonstrated that the phase-less I-OFDS of the present embodiments shows good accuracy in both configurations. The phase-less I-OFDS of the present embodiments is advantageous over conventional techniques since it is simple and leads to a significant cost reduction for optical characterization of diffuse or dispersive media.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

REFERENCES

[1] Y. C. Tong, L. Y. Chan and H. K. Tsang, "Fibre dispersion or pulse spectrum measurement using a sampling oscilloscope", Electronics Lett. 33(11) 983-985 (1997).

[2] H. Chi and J. Yao, "Fiber chromatic dispersion measurement based on wavelength-to-time mapping using a femtosecond pulse laser and an optical comb filter," Optics Communications 280(2) 337-342 (2007).

[3] Y. Wang, M. Han and A. Wang, "High-speed fiber-optic spectrometer for signal demodulation of inteferometric fiber-optic sensors," Opt. Lett. 312408-10 (2006).

[4] Y. Wang, M. Han and A. Wang, "Analysis of a high-speed fiber-optic spectrometer for fiber-optic sensor signal processing". App. Opt. 46 (33) 8149-58 (2007).

[5] J. Chou, B. Jalali and D. R. Solli, "Amplified wavelength-time transformation for real-time spectroscopy," Nature Photonics 2 (1) 48-51 (2008).

[6] P. V. Kelkar, F. Coppinger, A. S. Bhushan and B. Jalali, "Time-domain optical sensing," Electronics Letters 35 (19) 1661-2 (1999).

[7] J. Chou, Y. Han and B. Jalali, "Time-wavelength spectroscopy for chemical sensing. IEEE Photonics Tech. Lett. 16 (4) 1140-2 (2004).

[8] C. Furse, Y. C. Chung, R. Dangol, M. Nielsen, G. Mabey and R. Woodward, "Frequency-domain reflectometry for on-board testing of aging aircraft wiring" IEEE Transactions on Electromagnetic Compatibility 45 (2) 306-15 (2003).

[9] B. Soller, D. Gifford, M. Wolfe and M. Froggatt, "High resolution optical frequency domain reflectometry for characterization of components and assemblies," Opt. Exp. 13 666-74 (2005).

[10] K. Yuksel, M. Wuilpart, V. Moeyaert and P. Megret, "Optical frequency domain reflectometry: A review," in Proc. 11th Int. Conf. Transparent Opt. Netw. (ICTON '09), 1 723-727 (2009).

[11] H. Ghafoori-Shiraz and T. Okoshi, "Fault location in optical fibers using optical frequency domain reflectometry," J. Lightwave. Technol. 4316-22 (1986).

[12] S. Liehr, N. Notherb, M. Steffena, O. Gilib and K. Krebbera, "Performance of digital incoherent OFDR and prospects for optical fiber sensing applications," Proc. SPIE, 9157, Paper 915737, pp. 1-4 (2014).

[13] J. Hervas, C. R. Fernandez-Pousa, D. Barrera, D. Pastor, S. Sales and J. Capmany, "An interrogation technique of FBG cascade sensors using wavelength to radio-frequency delay mapping," J. Lightwave. Technol. 33 (11) 2222-7 (2015).

[14] J. C. Bellido and C. R. Fernandez-Pousa, "Spectral Analysis Using a Dispersive Microwave Photonics Link Based on a Broadband Chirped Fiber Bragg Grating," J. Lightwave. Technol. 33 (20) 4207-14 (2015).

[15] J. Park, W. V. Sorin and K. Y. Lau, "Elimination of the fibre chromatic dispersion penalty on 1550 nm millimeter-wave optical transmission," Electronics Lett. 33512-3 (1997).

[16] J. P. Dunsmore, Handbook of Microwave Component Measurements with Advanced VNA Techniques (Wiley, 2012).

[17] V. Lucarini, J. J. Saarinen, K. E. Peiponen and E. M. Vartiainen, Kramers-Kronig relations in optical materials research (Springer, 2005).

[18] A. L. Ricchiuti, D. Barrera, S. Sales, L. Thevenaz and J. Capmany, "Long fiber Bragg grating sensor interrogation using discrete-time microwave photonic filtering techniques," Opt. Exp. 2128175-81 (2013).

What is claimed is:

1. A method of spectroscopy, comprising:
transmitting output radiation to a sample;
collecting from the sample input radiation being indicative of interaction between said output radiation and said sample, following propagation of said input radiation in a medium;
modulating at least one of said output radiation and said input radiation, said modulation being characterized by a scanned modulation frequency;
processing said input radiation, following said modulation, to construct a dataset describing a dependence of a radiation property of said input radiation on said modulation frequency;

at least partially identifying said sample or a change in said sample based on at least said dataset and medium-specific functional dependences of amplitudes and phases on said modulation frequency and a carrier frequency of said input radiation.

2. The method of claim 1, wherein said functional dependence is expressed as a matrix and wherein said identification is by matrix manipulations.

3. The method according to claim 1, wherein said dataset comprises amplitudes describing a dependence of amplitude of said input radiation on said modulation frequency.

4. The method according to claim 3, further comprising employing transformation to said dataset of amplitudes to provide a dataset of phases describing a dependence of a phase of said input radiation on of said modulation frequency, wherein said at least partially identifying is based on both said datasets.

5. The method according to claim 1, wherein said dataset describes a dependence of a phase of said input radiation on said modulation frequency.

6. The method according to claim 5, wherein said processing comprises constructing an additional dataset describing a dependence of amplitude of said input radiation on said modulation frequency and wherein said at least partially identifying is based on both said datasets.

7. The method according to claim 1, wherein said radiation is optical radiation.

8. The method according to claim 7, wherein said transmitting and said collecting is by an optical probe which is devoid of any free-space propagation sections.

9. The method according to claim 7, wherein said processing is, in part, by an optical detector which is devoid of any free-space propagation sections.

10. The method according to claim 7, wherein said processing is at a single spatial channel for all wavelengths of said input radiation, following said modulation.

11. The method according to claim 1, wherein said processing comprises dispersing said input radiation according to a preselected dispersion relation, and wherein said dataset is constructed at least in part based on said dispersion relation.

12. The method according to claim 1, wherein said modulating is by an RF signal.

13. The method according to claim 1, further comprising calculating a spectrum of said input radiation using said dataset, wherein said at least partially identifying is based on said calculated spectrum.

14. The method according to claim 1, wherein said at least partially identifying comprises comparing said dataset to an annotated dataset.

15. The method according to claim 14, further comprising accessing a database comprising a plurality of entries, each having a dataset and annotation information, and searching said database for an entry having a dataset similar to said constructed dataset, wherein said annotated dataset is said similar dataset annotated according to annotation information of said entry.

16. The method according to claim 1, wherein said at least partially identifying comprises applying a machine learning procedure to said dataset.

17. A method of analyzing a spectrum of a radiation source transmitting output radiation, comprising:
    collecting input radiation being indicative of the transmitted output radiation;
    modulating at least one of said output radiation and said input radiation, wherein at least one of said output radiation and said modulation is characterized by a scanned modulation parameter;
    combining said input radiation, following said modulation, with a reference signal to provide a combined signal;
    processing said combined signal to construct a dataset describing a dependence of a radiation property of said input radiation on said parameter; and
    reconstructing a spectrum of said input radiation based on at least said dataset.

18. A spectroscopy system, comprising:
    a radiation probe configured for transmitting output radiation to a sample and collecting input radiation from the sample, said input radiation being indicative of interaction between said output radiation and said sample;
    a modulator configured for modulating at least one of said output radiation and said input radiation, wherein said modulation is characterized by a discrete set of modulation frequencies;
    a signal processing system configured for processing said input radiation, following said modulation, to construct a dataset describing a dependence of a radiation property of said input radiation on said discrete set of modulation frequencies; and
    a data processor configured for constructing, based on said processed combined signal, a dataset describing a dependence of a radiation property of said processed input radiation on said parameter, and determining changes in at least one property of said sample based on at least said vector, in a frequency domain and without transforming said vector to a time-domain.

19. The system of claim 18, wherein said signal processing system comprises a dispersive element, that disperses said input radiation and a radiation detector that converts the radiation to an electrical signal.

20. The system of claim 18, wherein said signal processing system comprises an analyzer system which also controls said modulator.

* * * * *